United States Patent
Wong

(10) Patent No.: US 7,702,743 B1
(45) Date of Patent: Apr. 20, 2010

(54) SUPPORTING A WEAK ORDERING MEMORY MODEL FOR A VIRTUAL PHYSICAL ADDRESS SPACE THAT SPANS MULTIPLE NODES

(75) Inventor: Kai C. Wong, Saratoga, CA (US)

(73) Assignee: Symantec Operating Corporation, Mountain View, CA (US)

(*) Notice: Subject to any disclaimer, the term of this patent is extended or adjusted under 35 U.S.C. 154(b) by 343 days.

(21) Appl. No.: 11/542,993

(22) Filed: Oct. 4, 2006

Related U.S. Application Data

(63) Continuation-in-part of application No. 11/340,102, filed on Jan. 26, 2006, and a continuation-in-part of application No. 11/340,227, filed on Jan. 26, 2006.

(51) Int. Cl.
G06F 15/167 (2006.01)
G06F 12/00 (2006.01)
(52) U.S. Cl. .................... 709/216; 711/141
(58) Field of Classification Search .......... None
See application file for complete search history.

(56) References Cited

U.S. PATENT DOCUMENTS

| | | | | |
|---|---|---|---|---|
| 4,933,846 | A * | 6/1990 | Humphrey et al. | 710/107 |
| 5,887,138 | A | 3/1999 | Hagersten et al. | |
| 5,924,119 | A * | 7/1999 | Sindhu et al. | 711/141 |
| 5,950,226 | A | 9/1999 | Hagersten et al. | |
| 5,983,326 | A | 11/1999 | Hagersten et al. | |
| 6,055,605 | A | 4/2000 | Sharma et al. | |
| 6,075,938 | A | 6/2000 | Bugnion et al. | |
| 6,243,794 | B1 | 6/2001 | Casamatta | |
| 6,321,238 | B1 * | 11/2001 | Putzolu | 707/205 |
| 6,341,340 | B1 * | 1/2002 | Tsukerman et al. | 711/150 |
| 6,363,458 | B1 * | 3/2002 | Park | 711/141 |
| 6,397,242 | B1 | 5/2002 | Devine et al. | |
| 6,446,220 | B1 * | 9/2002 | Menon | 714/5 |
| 6,457,107 | B1 * | 9/2002 | Wynn et al. | 711/152 |
| 6,496,847 | B1 | 12/2002 | Bugnion et al. | |

(Continued)

OTHER PUBLICATIONS

W.K. Giloi et al, A Distributed Implementation of Shared Virtual Memory with Strong and Weak Coherence, 1991, vol. 487, pp. 23-31.*

(Continued)

*Primary Examiner*—Ario Etienne
*Assistant Examiner*—Ho Shiu
(74) *Attorney, Agent, or Firm*—Lawrence J. Merkel; Meyertons, Hood, Kivlin, Kowert & Goetzel, P.C.

(57) ABSTRACT

In one embodiment, a virtual NUMA system may be formed from multiple computer systems coupled to a network such as InfiniBand, Ethernet, etc. Each computer includes one or more software modules which present the resources of the computers as a virtual NUMA machine. The virtual machine is a non-uniform memory access (NUMA) machine comprising a plurality of nodes, each node having memory that is part of a distributed shared memory. Additionally, the virtual machine is coherent with a weakly ordered memory model. When executed in a current owner node of a first block in response to an ownership transfer request from a requesting node of the plurality of nodes for the first block, the software modules perform a synchronization operation if the first block has been modified in the current owner node.

24 Claims, 13 Drawing Sheets

U.S. PATENT DOCUMENTS

| | | | |
|---|---|---|---|
| 6,654,858 B1* | 11/2003 | Asher et al. | 711/144 |
| 6,871,219 B2* | 3/2005 | Noordergraaf et al. | 709/214 |
| 6,948,035 B2* | 9/2005 | Rowlands et al. | 711/141 |
| 6,961,825 B2* | 11/2005 | Steely et al. | 711/141 |
| 6,996,748 B2 | 2/2006 | Uhling et al. | |
| 7,065,039 B2* | 6/2006 | Ying | 370/222 |
| 7,328,364 B1 | 2/2008 | Leong et al. | |
| 7,409,525 B1 | 8/2008 | Clark et al. | |
| 7,596,654 B1 | 9/2009 | Wong | |
| 2001/0039550 A1* | 11/2001 | Putzolu | 707/205 |
| 2001/0047340 A1* | 11/2001 | Snow et al. | 705/58 |
| 2002/0087811 A1 | 7/2002 | Khare et al. | |
| 2002/0124172 A1* | 9/2002 | Manahan | 713/176 |
| 2003/0105828 A1 | 6/2003 | Sano et al. | |
| 2003/0217234 A1* | 11/2003 | Rowlands | 711/141 |
| 2003/0217238 A1* | 11/2003 | Rowlands et al. | 711/154 |
| 2004/0010612 A1 | 1/2004 | Pandya | |
| 2004/0117345 A1* | 6/2004 | Bamford et al. | 707/1 |
| 2004/0210713 A1* | 10/2004 | Kanai | 711/113 |
| 2004/0225719 A1 | 11/2004 | Kisley et al. | |
| 2005/0033656 A1* | 2/2005 | Wang et al. | 705/26 |
| 2005/0044301 A1* | 2/2005 | Vasilevsky et al. | 711/1 |
| 2005/0080982 A1 | 4/2005 | Vasilevsky et al. | |
| 2005/0154825 A1 | 7/2005 | Fair | |
| 2005/0160430 A1* | 7/2005 | Steely et al. | 719/310 |
| 2006/0045098 A1 | 3/2006 | Krause | |
| 2006/0075057 A1 | 4/2006 | Gildea et al. | |
| 2006/0206603 A1 | 9/2006 | Rajan et al. | |
| 2007/0101069 A1 | 5/2007 | Corbett et al. | |
| 2008/0270307 A1* | 10/2008 | Olson et al. | 705/51 |

OTHER PUBLICATIONS

Eugene D. Brooks III et al, A study of Performance on SMP and Distributed Memory Architectures Using a Shared Memory Programming Model, 1997, IEEE.*

Leonidas I. Kontothanassis and Michael L. Scott, "Software Cache Coherence for Large Scale Multiprocessors", Department of Computer Science, University of Rochester, Jul. 1994, pp. 1-20.

Kinshuk Govil et al., "Cellular Disco: Resource Management Using Virtual Clusters on Shared-Memory Multiprocessors", 17th ACM Symposium on Operating System Principles (SOSP '99) Published as Operating Systems Review 34(5): Dec. 1999, pp. 154-169.

"White Paper, GSX Server," VMare, Inc., Dec. 2000, pp. 1-9.

"Manage Multiple Worlds, From Any Desktop," VMware, Inc., 2000, 2 pages.

"Vmware GSX Serve, The Server Consolidation Solution," VMware, Inc., 2001, 2 pages.

"NMware ESX Server, The Server Consolidation Solution for High-Performance Environments," VMware Inc., 2001, 2 pages.

Mark T. Chapman, "Introducing IBM Enterprise X-Architecture Technology" A new generation of computing power and flexibility for industry-standard servers, IBM Server Group Aug. 2001, pp. 1-24.

"Static Resource Affinity Table", Mar. 31, 2003, pp. 1-14.

Ranjit M. Noronha and Dhabaleswar K. Panda, "Designing High Performance DSM Systems Using InfiniBand: Opportunities, Challenges, and Experiences", Department of Computer and Information Science, The Ohio State University, Nov. 5, 2003, pp. 1-11.

Nieplocha, J., et al., "Optimizing Mechanisms for Latency Tolerance in Remote Memory Access Communication on Clusters", IEEE Cluster Commuting Dec. 1, 2003, pp. 1-10.

Ranjit Noronha and Dhabaleswar K. Panda, "Reducing Diff Overhead in Software DSM Systems Using RDMA Operations in InfiniBand", Workshop on RDMA: Applications, Implementations, & Technologies, 2004, pp. 1-8.

Ranjit Noronha and Dhabaleswar K. Panda, "Designing High Performance DSM Systems Using InfiniBand Features", 4th IEEE/ACM International Symposium on Cluster Computing & The Grid, Apr. 2004, pp. 1-8.

Tipparaju, V., et al., "Host-Assisted Zero-Copy Remote Memory Access Communication on InfiniBand", Pacific Northwest National.

Matthew Chapman and Gernot Heiser, "Implementing Transparent Shared Memory on Clusters Using Virtual Machines", The University of New South Wales, Sydney, Australia, First published in proceedings of USENIX 05: General Track Anaheim, CA, Apr. 2005, pp. 1-4.

"Advanced Configuration and Power Interface Specification", Hewlett-Packard Corporation, Intel Corporation, Microsoft Corporation, Phoenix Technologies Ltd, Toshiba Corporation, Revision 3.0a, Dec. 30, 2005, pp. 1-4.

Murali Rangarajan "Virtual Interface Architecture" URL: http://www.usenix.org, Aug. 8, 2000, pp. 1-2.

Peter K. Keleher, "The Coherent Virtual Machine" URL: http://www.cs.umd.edu/projects/cvm, Nov. 21, 1996, pp. 1-8.

Shuang Liang et al., "Swapping to Remote Memory Over InfiniBand: An Approach Using a High Performance Network Block Device", The Ohio State University, IEEE Cluster Computer, Sep. 2, 2005, pp. 1-10.

Shuang Liang et al., "Exploiting Remote Memory in InfiniBand Clusters Using a High Performance Network Block Device(HPBD)", Technical Report, 2005 pp. 1-11.

Ranjit Noronha and Dhabaleswar K. Panda, "Can High Performance Software DSM Systems Designed With Infiband Features Benefit from PCI-Express?", 5th IEEE/ACM International Symposium on Cluster Computing & The Grid, Apr. 2005, pp. 1-8.

Jeff Dike, "UML Clustering", URL: http://user-mode-linux.sourceforge.net/als2001/node20.html, Downloaded Dec. 5, 2005, pp. 1-2.

"H8501 Overview" Iwill Server Company, URL: http://www.iwill.net, Downloaded Jan. 3, 2006 pp. 1-5.

Jeffrey Burt, "Virtual Iron Tool Creates Virtual Scalable System", URL: http://www.eweek.com, Feb. 14, 2005, pp. 1-4.

Jeffrey Burt, "Virtual Iron updates Virtualization Software:", URL: http://www.eweek.com, Nov. 1, 2005, pp. 1-4.

Anonymous, High Efficiency Servers from Rackable Systems, URL:http//www.technologynewsdaily.com, Nov. 14, 2005, pp. 1-2.

Mr J. Tanabe, "Relaxed Consistency Models and Software Distributed Memory" Textbook pp. 79-83.

Kai Wong "86-based Virtual SMP/NUMA Server Comparison", Symantec Corporation, Cupertino, CA.

Discussion x86_64-2.1.10rc2-1 released URL: http//www.x86-64.org/lists/discuss/msg0587.html Downloaded from internet Jan. 17, 2006.

U.S. Patent Application Entitled, "Efficient Data Transfer Between Computers in a Virtual NUMA System Using RDMA" filed Jan. 26, 2006, U.S. Appl. No. 11/340,102.

U.S. Patent Application Entitled, "Virtual Machine Spanning Multiple Computers" filed Jan. 26, 2006, U.S. Appl. No. 11/340,227.

Office Action from U.S. Appl. No. 10/340,227 mailed Mar. 7, 2008.
Office Action from U.S. Appl. No. 10/340,227 mailed Aug. 12, 2008.
Office Action from U.S. Appl. No. 10/340,227 mailed Jan. 12, 2009.
Office action mailed Jun. 19, 2009 in U.S. Appl. No. 11/340,102, titled "Efficient Data Transfer Between Computers in a Virtual NUMA System Using RDMA", filed Jan. 26, 2006.

* cited by examiner

Lock X
Update Y
Unlock X
Fig. 14
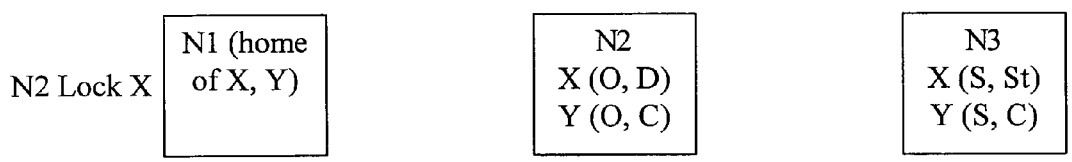
Fig. 15
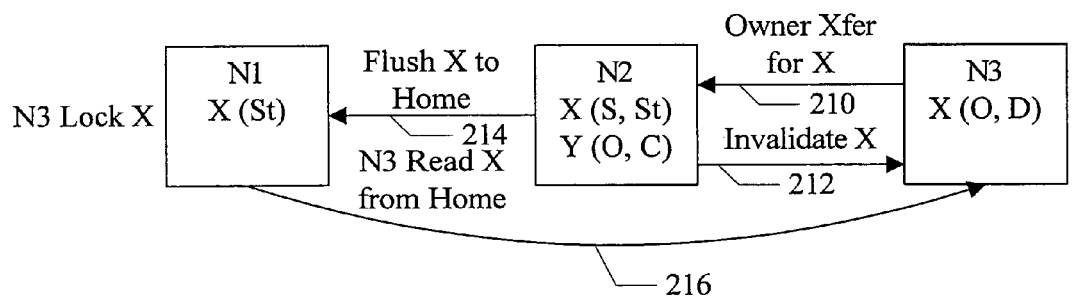
Fig. 16
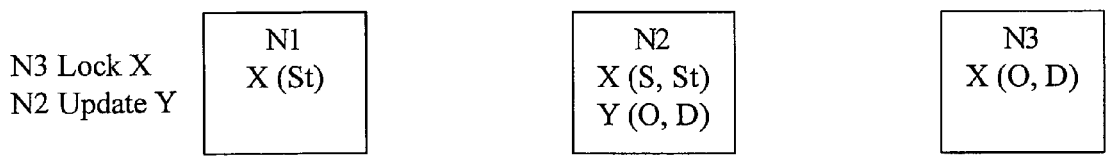
Fig. 17

SUPPORTING A WEAK ORDERING MEMORY MODEL FOR A VIRTUAL PHYSICAL ADDRESS SPACE THAT SPANS MULTIPLE NODES

This application is a continuation-in-part of U.S. patent application Ser. No. 11/340,102, filed on Jan. 26, 2006. This application is a continuation-in-part of U.S. patent application Ser. No. 11/340,227, filed on Jan. 26, 2006.

BACKGROUND

1. Field of the Invention

This invention is related to computers and virtual machines used with computers.

2. Description of the Related Art

Computers have become a ubiquitous part of modern society, and users have employed them for numerous demanding and often critical tasks. As the complexity and number of application programs for computers continues to grow, it is often the case that a computer employing a single processor (or central processing unit, CPU) is insufficient to execute the programs with the desired performance. Some computers implement multiple processors in a symmetric multiprocessing (SMP) configuration, sharing a common memory. However, bandwidth limits and the physical limits on the size of a single memory system limit the number of processors in an SMP configuration that can effectively share the memory. Another system configuration that has been used in the past is a cache-coherent, non-uniform memory access (ccNUMA) system. In ccNUMA systems, dedicated hardware is used to connect multiple nodes (each having processors and memory, and optionally input/output (I/O) devices) into a computer system. The dedicated hardware handles cache coherency, and also handles access by one node to another node's memory. The nodes are typically interconnected by a proprietary, high speed interconnect. The ccNUMA configuration may provide scalable performance, but is often expensive due to the dedicated hardware and proprietary interconnect used in these systems. An exemplary ccNUMA system is the Sequent computer system manufactured by IBM Corporation.

SUMMARY

In one embodiment, a virtual NUMA system may be formed from multiple computer systems coupled to a network such as InfiniBand, Ethernet, etc. Each computer includes one or more software modules which present the resources of the computers as a virtual NUMA machine. The virtual NUMA machine comprises a plurality of nodes, each node having memory that is part of a distributed shared memory. Additionally, the virtual machine is coherent with a weakly ordered memory model. When executed in a current owner node of a first block in response to an ownership transfer request from a requesting node of the plurality of nodes for the first block, the software modules perform a synchronization operation if the first block has been modified in the current owner node.

Performing the synchronization operation when transferring ownership of a modified (or "dirty") block may implement the weakly ordered model correctly, in some embodiments. In some cases, the synchronization operation may occur even if a synchronization was not specified in the underlying instructions that caused the modification to the block. However, cases in which the synchronization operation was specified may be implemented correctly. The implementation may be relatively efficient, while correctly implementing a weakly ordered model (e.g. based on release consistency).

BRIEF DESCRIPTION OF THE DRAWINGS

The following detailed description makes reference to the accompanying drawings, which are now briefly described.

FIG. 14 is a block diagram illustrating a sequence that may be used for weak ordering.

FIGS. 15-20 illustrate an example of the sequence shown in FIG. 14 executed by two nodes for one embodiment.

Figure 1:
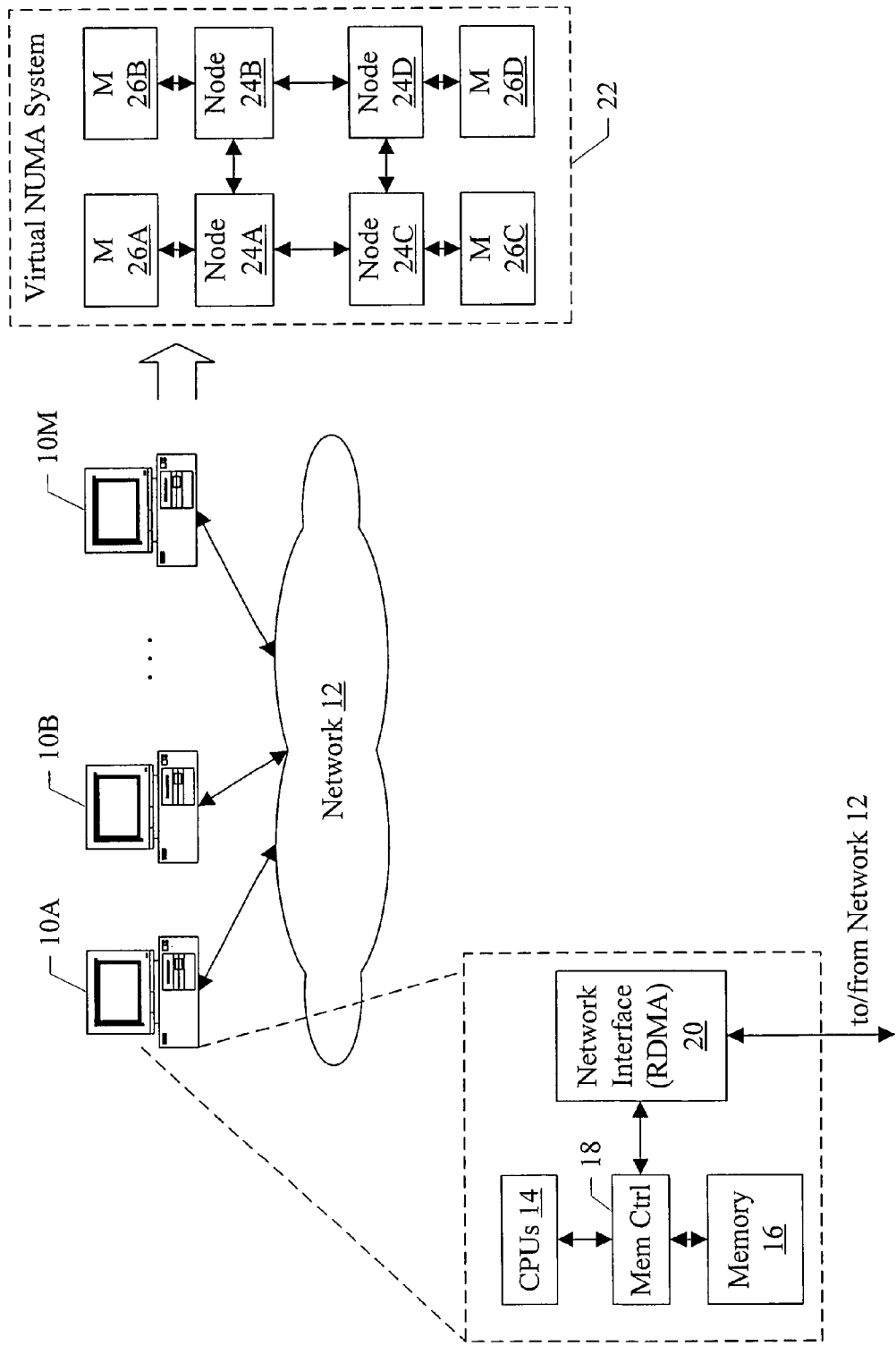
FIG. 1 is a block diagram of one embodiment of a set of computers and a network, and corresponding virtual NUMA system, with one computer system shown in exploded view for one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system comprising a plurality of computers 10A-10M coupled to a network 12 is shown. Generally, there may be any number of two or more computers 10A-10M in various embodiments. Each computer may comprise any computing device that is capable of independent program execution using the hardware and software resources within the computer device. For example, a computer may be physically housed in a computer housing (e.g. a personal computer (PC) in a desktop form factor or laptop form factor, a workstation, a server, a server in a rack mount, etc.). A computer may be one of the blades in a blade server. The network 12 may be any computer interconnection. For example, the network 12 may be compatible with the InfiniBand specification. Alternatively, the network 12 may be compatible with Ethernet, Gigabit Ethernet, 10 Gigabit Ethernet, or any other network (local area, wide area, etc.).

As will be discussed in more detail below, each computer 10A-10M may include one or more software modules that are configured to present, to a guest operating system, a virtual machine that spans the computers 10A-10M. That is, the resources of the computers 10A-10M may be presented as a virtual machine across the computers. Generally, a software module may comprise an arrangement of instructions which, when executed on a computer, implement the operation described for the module. The instructions may be directly executed on the processor, and/or may be higher level instructions that may be interpreted (e.g. Java byte codes, shell script, etc.). A guest operating system may execute on the virtual machine. Since each computer 10A-10M may include its own internal memory (referred to herein as a local memory), the latency of access for a given guest application or the guest operating system may vary depending on whether or not the application/operating system is executing on the same computer as the accessed memory. Thus, the virtual machine may implement a NUMA system.

A virtual NUMA system 22 is illustrated in FIG. 1. The virtual NUMA system 22 may include a plurality of nodes (e.g. nodes 24A-24D in FIG. 1) coupled to each other and each having a memory (memories 26A-26D in FIG. 1). The address space of the virtual NUMA system 22 spans the memories 26A-26D, and thus the memories 26A-26D form a distributed shared memory system. In one embodiment, each computer 10A-10M may implement one of the nodes 24A-24D, and the corresponding memory 26A-26D may comprise at least a portion of the local memory 16 in that computer 10A-10M. In other embodiments, more than one virtual NUMA system may be implemented on the computers 10A-10M.

By using the computers 10A-10M to form a virtual NUMA machine, the costs associated with the proprietary hardware and interconnect of a physical NUMA machine may be avoided, in some embodiments. Instead, the network 12 may be used to communicate data from one local memory 16 to a different requesting computer 10A-10M. In some embodiments, RDMA may be used to facilitate lower latency transfers. A portion of each local memory 16, not including the portion mapped to the memory space of the virtual machine, may be used to cache data accessed from remote computer systems.

The guest operating system may preferably be NUMA-aware (e.g. Windows Server 2003, Enterprise or Datacenter editions, certain versions of Linux, etc.). Such operating systems may be configured to recognize which portions of the address space are local versus remote (or "far"), and may attempt to favor local memory allocations for applications, to reduce the latency of memory accesses. Accordingly, the frequency of remote data accesses may be minimized, and thus the higher latency of the access over the network 12 (as compared to the proprietary interconnects often used in physical NUMA machines) may have less impact on the performance, in some embodiments. Furthermore, the guest operating system may execute on the virtual machine without modification. That is, the guest operating system may be used in the same fashion that it would be used on a physical NUMA machine.

The computer 10A is illustrated in exploded view in FIG. 1 to show certain hardware resources that may be included in the computer 10A. Other computers 10B-10M may be similar. The hardware resources may generally include one or more processors (e.g. CPUs 14), local memory (e.g. memory 16 coupled to a memory controller 18), I/O devices (e.g. the network interface device 20), etc. The network interface device 20 is coupled to the memory controller 18 in the illustrated embodiment, and may implement a remote direct memory access (RDMA) operation to permit remote access to the memory 16 and to remotely access the memory 16 in other computers 10B-10M. Other embodiments may not implement RDMA, if desired. The network interface device 20 is also coupled to communicate on the network 12.

The processors 14 comprise the circuitry to execute machine instructions defined in the instruction set architecture implemented by the processors 14. Any instruction set architecture may be implemented in various embodiments (e.g. x86, or IA-32, and various extensions, IA-64, PowerPC, SPARC, MIPS, ARM, etc.).

The memory controller 18 comprises the circuitry to receive memory requests (e.g. from the processors 14, the network interface device 20, and/or other I/O devices) and configured to communicate on the memory interface to the memory 16 to service the requests (e.g. reading or writing the addressed memory locations). The memory 16 may comprise any semiconductor memory devices (e.g. random access memory (RAM) such as dynamic RAM (DRAM), synchronous DRAM (SDRAM), double data rate (DDR) SDRAM, DDR SDRAM II, Rambus DRAM (RDRAM), etc.).

The network interface device 20 comprises circuitry configured to communicate on the network 12, according to the network protocol implemented on the network, as well as to communicate with other circuitry within the computer 10A. It is noted that other I/O devices may be included as well (e.g. mass storage devices such as disk drives, video and audio I/O, etc.).

It is noted that the processors 14 and the network interface device 20 may be coupled to the memory controller 18 in any desired fashion. For example, the processors 14 may be coupled to a shared bus with the memory controller 18 (or a North Bridge that includes the memory controller 18), may have point to point connects to the memory controller 18 (or the North Bridge) or may have any other circuitry between the processors 14 and the memory controller 18. Similarly, the network interface device 20 may be coupled to a peripheral interface (e.g. peripheral component interconnect express (PCI-E), universal serial bus (USB), etc.) to the memory controller 18 (or the North Bridge) or any other circuitry may be coupled between the network interface device 20 and the memory controller 18. It is further noted that the virtual NUMA system 22 may comprise any number of two or more nodes 24A-24D.

Figure 2:
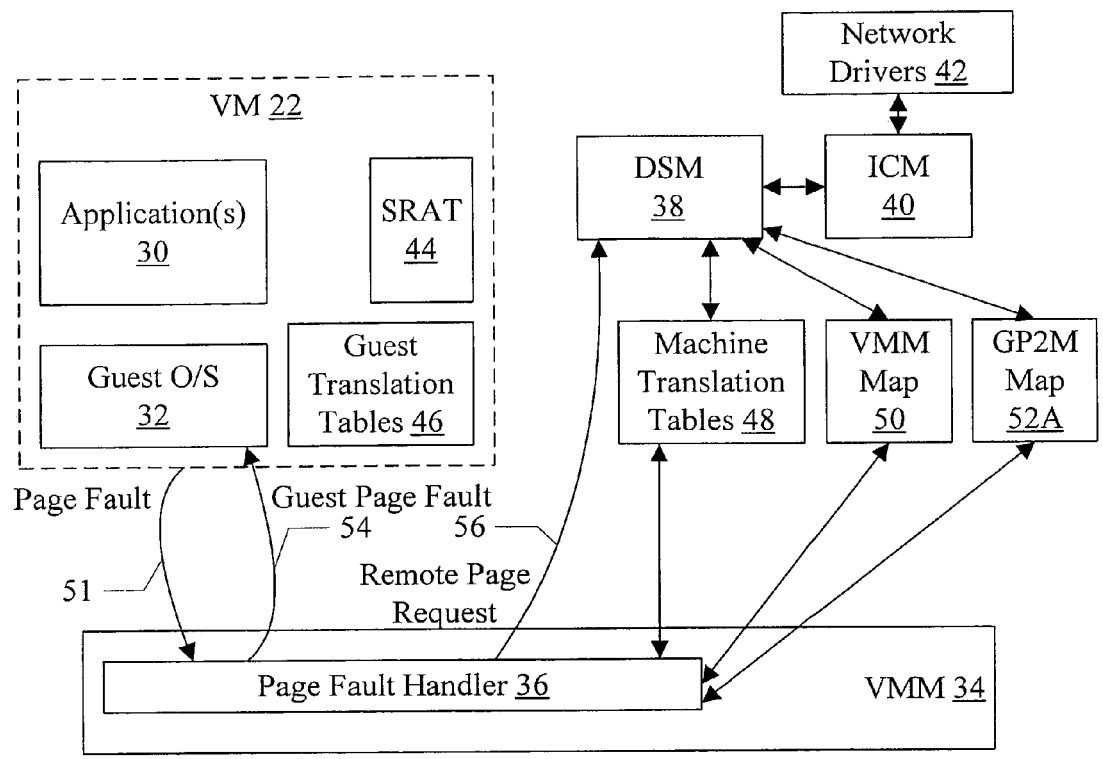
FIG. 2 is a block diagram illustrating certain software components corresponding to one embodiment.

Turning now to FIG. 2, a block diagram is shown illustrating various software modules and data structures that may be used in one embodiment on a computer 10A-10M to form a virtual NUMA system across the computers 10A-10M. Similar modules may be provided on other computers 10A-10M. In the illustrated embodiment, the modules include one or more applications 30, a guest operating system 32, a virtual machine monitor (VMM) 34 that includes a page fault handler 36, a distributed shared memory (DSM) module 38, an internodal communication module (ICM) 40, and network drivers 42. The data structures include a static resource affinity table (SRAT) 44, guest translation tables 46, machine translation tables 48, a VMM map 50, and a guest physical to machine address (GP2M) map 52A. The applications 30, the guest operating system 32, the SRAT 44, and the guest translation tables 46 may be part of the virtual machine (VM) 22 controlled by the VMM 34.

The VMM 34 may generally monitor the operation of the virtual machine 22, to intercept any events that may require emulation to provide the virtual resources of the virtual machine 22 to the guest operating system 32 and the applications 30. For example, in the present embodiment, the virtual machine 22 is a NUMA system having a distributed shared memory. Accordingly, the virtual machine 22 may have an address space that spans the memories 26A-26D (that is, the address space may uniquely address each memory location in each memory 26A-26D). The address space of the virtual machine 22 is referred to as the guest physical address space herein. The guest physical address space may be mapped to at least a portion of the local memory 16 in each computer 10A-10M. Accordingly, the guest operating system 32 or applications 30 may be executing on one computer 10A-10M and an access to a guest physical address mapped to another computer 10A-10M may be generated. The guest operating system 32 is executing on a virtual node 24A-24D, and expects the virtual NUMA system 22 to fetch the data from the other virtual node 24A-24D that is coupled to the memory location referenced by the guest physical address. The VMM 34, and more particularly the page fault handler 36, along with the DSM 38 may cooperate to emulate this functionality for the guest operating system 32.

While a copy of the guest operating system 32 may exist on each computer 10A-10M (e.g. on nonvolatile storage, such as disk storage, on each computer and in memory when available for execution on that computer), the guest operating system on all the computers collectively execute as a single instance. That is, the guest operating system's view of the computers 10A-10M is the virtual NUMA system 22, and when the guest operating system executes on a given computer 10A-10M, it views its execution as occurring on one of the nodes 24A-24D and it may execute on any node 24A-24D at any point in time.

The guest operating system 32 may provide a virtual address space for the applications 30, using the guest translation tables 46. That is, the guest translation tables 46 may map guest virtual addresses used by the applications 30 to guest physical addresses. However, the actual hardware in the computers 10A-10M access machine addresses that address the local memory 16 in a given computer 10A-10M. Accordingly, the page fault handler 36 and the DSM 38 may cooperate to maintain the machine translation tables 48. The machine translation tables 48 may be used while the guest operating system 32 and/or applications 30 are executing, and may map guest virtual addresses to machine addresses. The machine translation tables 48 may also map guest physical addresses to machine addresses, for addresses generated when the guest operating system 32 has disabled translation within the virtual machine, even though the physical computers still have translation enabled.

If a guest virtual address is generated that does not have a mapping in the machine translation tables 48, the processor hardware may signal a page fault (arrow 51). The page fault may be an event that is intercepted by the VMM 34 (and more particularly the page fault handler 36). The page fault handler 36 may check the guest translation tables 46 to determine if the page fault is actually a guest page fault (that is, there is no mapping in the guest translation tables 46 and the guest operating system 32 needs to allocate a page in the guest physical address space). If the page fault is a guest page fault (arrow 54), the page fault handler 36 may reflect the page fault back to the guest operating system 32 for handling. If the page fault is not a guest page fault, the page fault handler 36 may either handle the page fault (if the guest physical address is mapped to the same computer 10A-10M on which the page fault occurs) or may generate a remote page request (arrow 56) to the DSM 38 to fetch the page and create a mapping for the guest physical address. Additional details are provided below.

The DSM 38 may generally be responsible for emulating the distributed shared memory system of the VM 22 over the local memories 16 of the computers 10A-10M. The DSM 38 may move data between computers 10A-10M, over the network 12, as needed according to the execution of the guest operating system 32 and/or the applications 30. In some embodiments, the NUMA system 22 may be cache coherent, and the DSM 38 may enforce the coherence of the data.

The VMM map 50 may store information that may be used by the page fault handler 36, the DSM 38, and possibly other code in the VMM 34 to determine which guest physical addresses map to which computers 10A-10M. More specifically, the VMM map 50 may map guest physical address ranges to virtual nodes in the virtual NUMA system 22, which then implies a computer 10A-10M that acts as the virtual node. The computer 10A-10M to which a range of guest physical addresses is mapped is referred to as the home node of that range of guest physical addresses. While pages assigned to a given home node may be cached in other computers, in some embodiments, the given home node has a static page allocated to each page in the range, to which modifications to the page may eventually be written (even if temporarily cached in another computer). The guest physical addresses in the range assigned to a given home node may be referred to as local guest physical addresses in that home node. The VMM map 50 may be generated prior to boot of the virtual NUMA system 22 on the computer systems 10A-10M. Specifically, in this embodiment, the information of which machine addresses map to which guest physical addresses in a given computer 10A-10M to which the guest physical addresses are assigned may not be included in the VMM map 50. Rather, guest physical addresses may be used in requests for remote pages, and the home node may map the guest physical address to a machine address in its local memory 16. The guest physical to machine address mappings may be maintained in the GP2M map 52A (and similar maps on other computers, collectively referred to as GP2M maps 52). Such a configuration may be scalable, since each node need only have the guest physical address to machine address mappings for its own local memory 16 (including cached mappings, in some embodiments, described in more detail below).

In one embodiment, the SRAT 44 may be generated from a configuration file or files, and the VMM map 50 may be generated from such configuration files as well. The SRAT 44 is defined by the Advanced Configuration and Power Interface (ACPI) specification to describe the physical locations of processors and memory in systems such as ccNUMA systems. The SRAT 44 may be used, for example, in computers that employ processors compatible with the x86 instruction set architecture (also referred to as IA-32 or APX). The SRAT 44 may be supported by the Windows 2003 operating system, Linux, etc. Accordingly, an SRAT 44 may be defined for the virtual NUMA system 22, and the SRAT 44 may be included in the virtual machine. During boot of the virtual NUMA system 22, the SRAT 44 may be read and may be used to establish mappings to each local memory 16. While the SRAT is ACPI specific, other embodiments may include any configuration file or files to describe the address ranges and their assignment to nodes in the virtual NUMA system 22. Each computer 10A-10M may also include a virtual node number that identifies the computer 10A-10M as corresponding to one of the nodes 24A-24D. In embodiments that support multiple virtual NUMA systems, a virtual node number for each virtual NUMA system may be included in each computer 10A-10M.

The ICM 40 may be configured to interface with the network drivers 42 to transmit communications on the network 12 on behalf of the DSM 38. Accordingly, the DSM 38 may be generic to any network 12, and an appropriate ICM 40 may be provided if a given network is selected for the system. In other embodiments, the DSM 38 may be network-specific and the ICM 40 may be eliminated.

In some embodiments described in more detail below, one node 24A-24D corresponds to a given computer 10A-10M. In other embodiments, multiple computers 10A-10M may represent a given node and/or multiple nodes may correspond to a given computer 10A-10M. If one node is represented by multiple computers, the portion of the guest physical address space assigned to that node may be subdivided into ranges that are mapped to the multiple computers. If multiple nodes are mapped to one computer, each guest physical address range assigned to each of the nodes may be mapped to local memory in that computer. Furthermore, multiple guest physical address ranges may be mapped to the same computer if the SRAT indicates that multiple address ranges are assigned to a given node.

Figure 3:
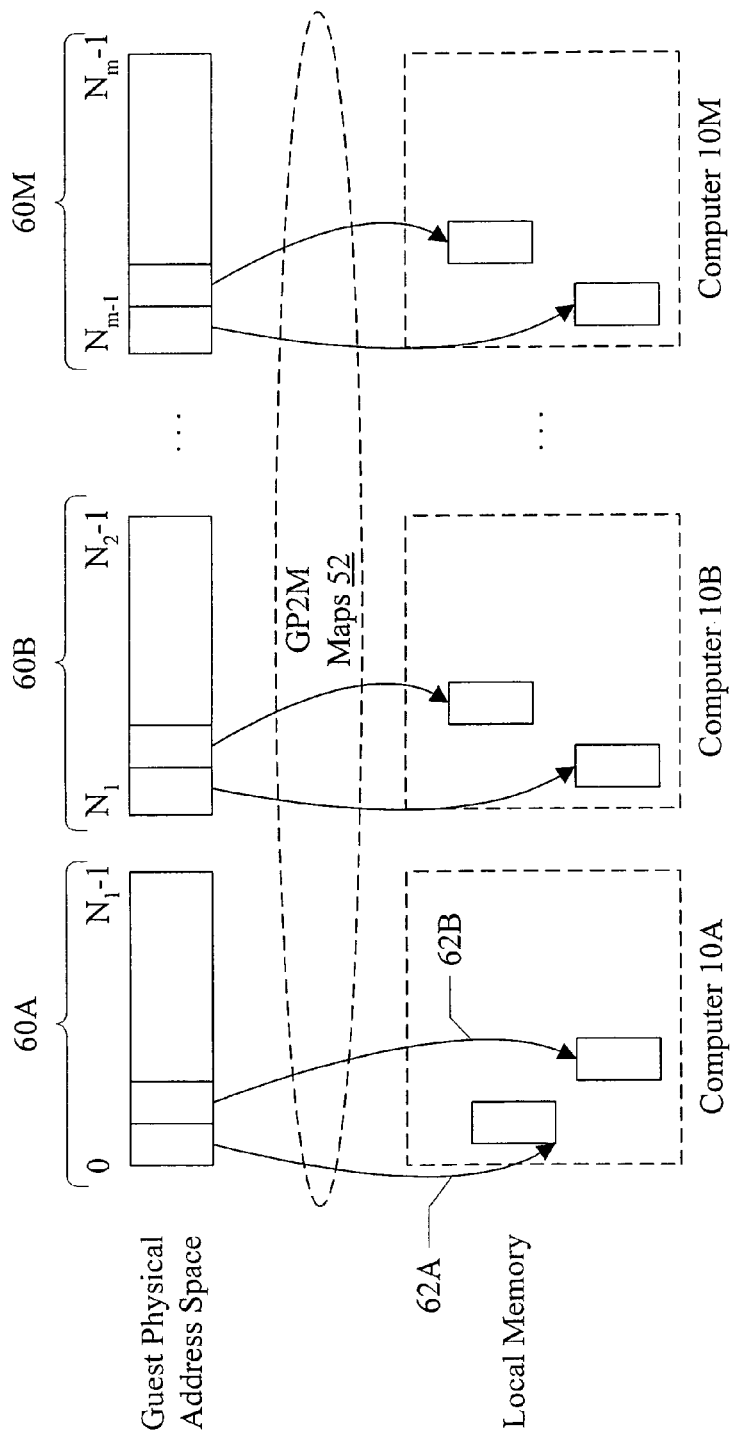
FIG. 3 is a block diagram of one embodiment of a guest physical address space mapped to memory on multiple computers.

Turning now to FIG. 3, a block diagram of one embodiment of the guest physical address space and the mapping of guest physical addresses to local memory in each computer 10A-10M is shown. The guest physical address space is enumerated from 0 to $N_m-1$, and is divided into multiple ranges 60A-60M. Each range 60A-60M is mapped to local memory in a computer 10A-10M through the GP2M maps 52 on each computer 10A-10M. For example, two blocks in each range are shown mapped to blocks in the corresponding local memory (e.g. arrows 62A-62B, from range 60A to the local memory of computer 10A).

The size of the blocks that are mapped from the guest physical address space to the local memory may vary from embodiment to embodiment. In one embodiment, the blocks may be one page in size, where a page is the unit of mapping in the guest translation tables 46. A page will be used as an example herein, but blocks of different granularities (e.g. less than a page, or multiple pages) may be used in other embodiments. The page size may also vary. For example, page sizes of 4 kilobyte, 8 kilobyte, 2 Megabyte, and 4 Megabyte are common, and even larger sizes may be used in the future. Any size page may be used, and multiple page sizes may be supported, in various embodiments.

Figure 4:
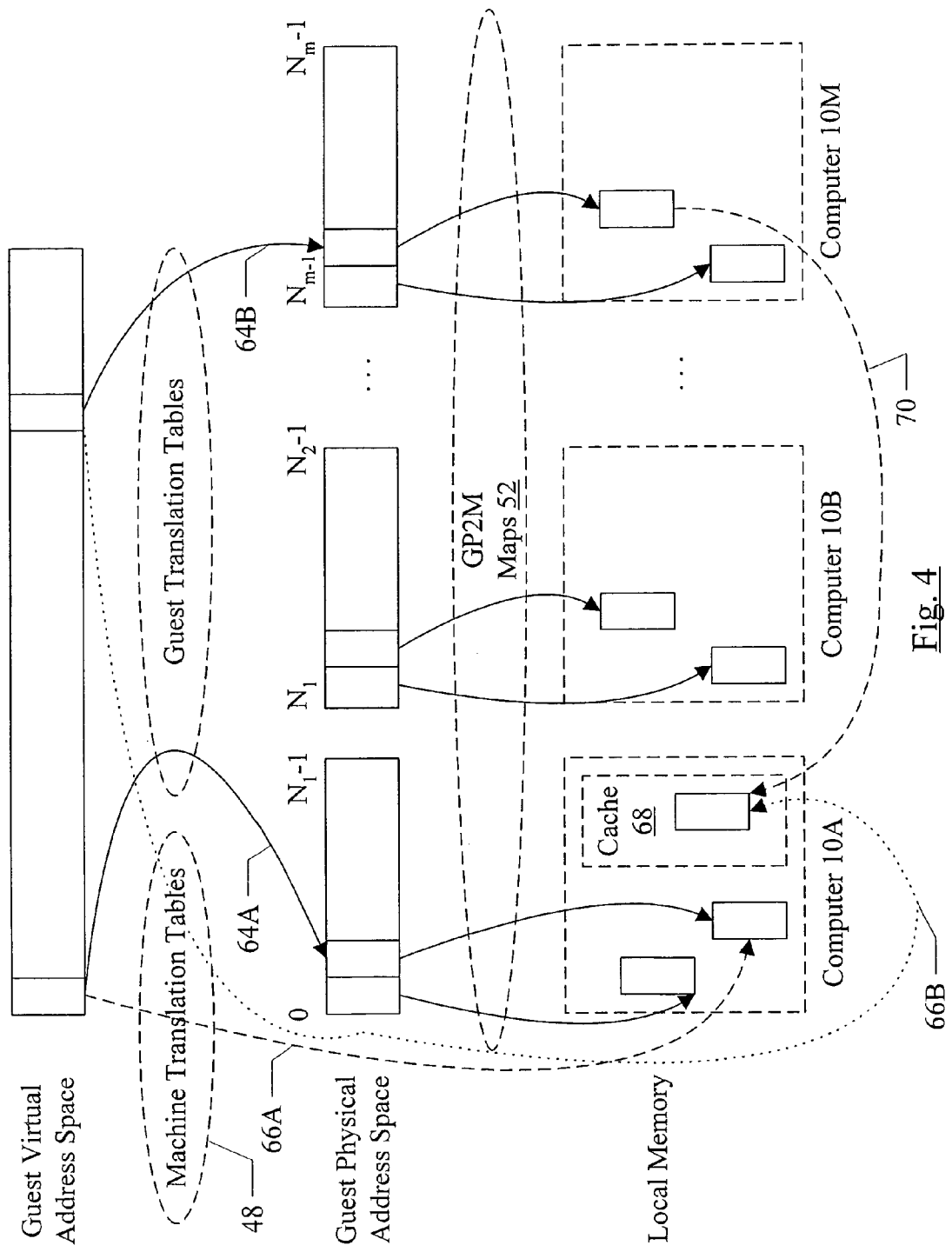
FIG. 4 is a block diagram of one embodiment of a mapping between guest virtual, guest physical, and machine memory.

FIG. 4 is a block diagram illustrating one embodiment of a guest virtual address space (e.g. used by the applications 30), the guest physical address space, and the node memory on each computer 10A-10M. The mapping from the guest physical address space to the node memories, through the GP2M maps 52, is similar to that shown in FIG. 3. The mapping of guest physical address space to node memory may be static, in some embodiments. For example, in embodiments in which ccNUMA is implemented, coherency may be tracked at the home node. Having a static assignment of guest physical address space to local memories makes determining the home node straightforward.

Additionally, the mapping of guest virtual addresses to guest physical addresses through the guest translation tables 46 is also shown. For example, solid arrows 64A and 64B in FIG. 4 illustrate the mapping of a pair of guest virtual pages to a guest physical page in the ranges assigned to computers 10A and 10M, respectively. The mapping of guest virtual addresses to guest physical addresses is performed by the guest operating system 32. In embodiments in which the guest operating system 32 is NUMA-aware, the guest operating system 32 may favor the allocation of guest physical pages that are mapped to the same node on which the application that uses the page is executing. However, in some cases, a guest physical page mapped to another node may be used.

As mentioned previously, the machine translation tables 48 maintained by the DSM 38 and the page fault handler 36 map the guest virtual addresses to the local memory directly, based on the mappings of guest virtual to guest physical addresses generated by the guest operating system 32 and the mapping of guest physical addresses to local memory. Thus, for example, dashed arrow 66A represents the translation of the guest virtual address corresponding to arrow 64A to the corresponding page in the local memory of the computer 10A.

For pages that are remote to the computer on which the application is executing (the "local computer"), a local copy may be obtained and cached in a cache 68 within the local memory of the computer. When the page fault for the remote page is detected, and the page fault handler 36 makes the remote page request 56 to the DSM 38, the DSM 38 may allocate a page in the cache 68 and may transfer a copy of the page from the remote computer to the local computer (e.g. dashed arrow 70 for the remote page corresponding to arrow 64B). A translation in the machine translation tables 48 from the guest virtual address to the cached paged in the cache 68 may be established (dotted arrow 66B) and the corresponding GP2M map 52 may also be updated, if the cache 68 is tracked in the GP2M map 52.

The caching of remote pages in a local computer may permit repeated access to the page without having to perform multiple transfers on the network 12. In some embodiments, the DSM 38 may maintain coherency of the cached copy with other DSMs 38 on other computers 10A-10M. It is noted that the machine translation tables 48 on a given computer 10A-10M may differ from the machine translation tables 48 on other computers 10A-10M since different pages are remote to each computer and thus may be cached in the cache 68 of that computer.

Figure 5:
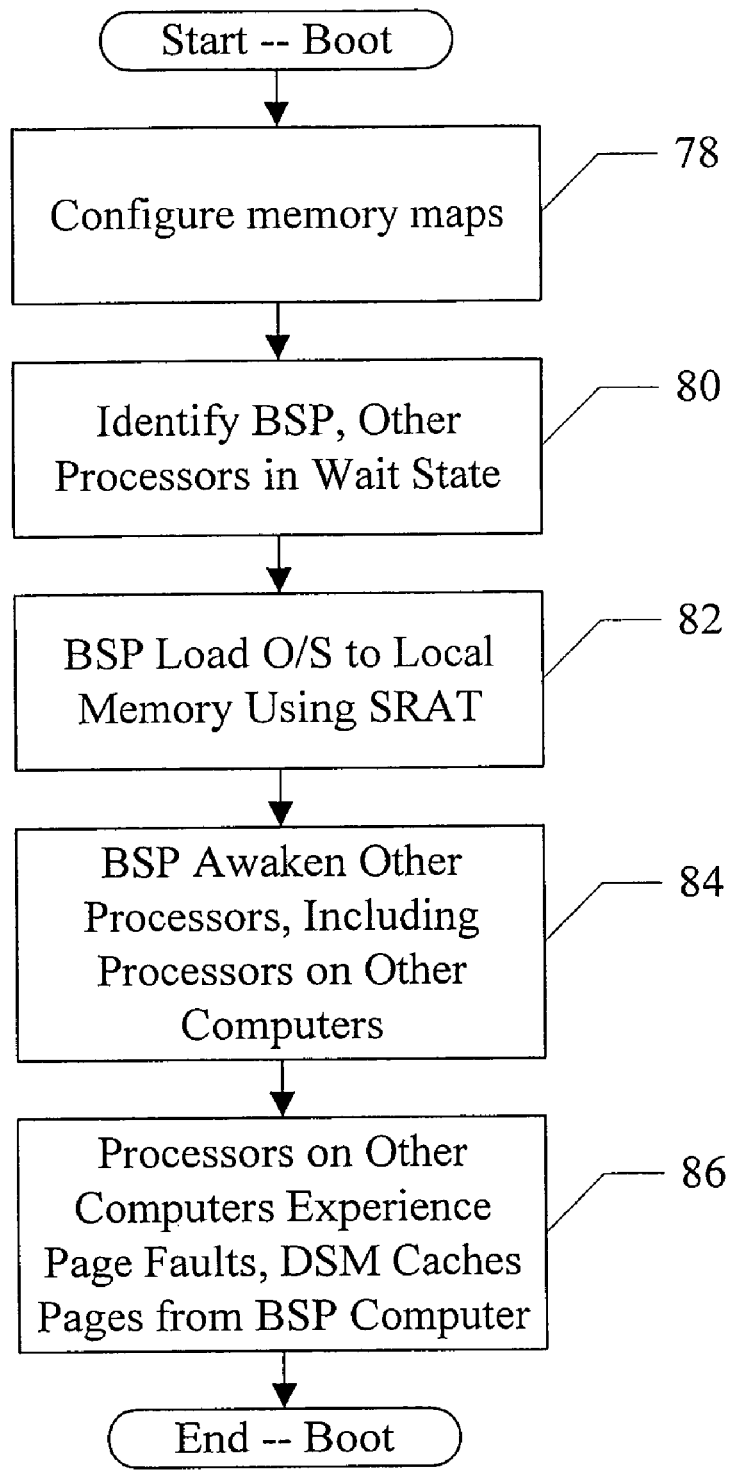
FIG. 5 is a flowchart illustrating one embodiment of booting computer systems.

Turning now to FIG. 5, a flowchart is shown illustrating operation of one embodiment of the VMM 34 and the DSM 38 during boot of the virtual NUMA system 22. While the blocks are shown in a particular order for ease of understanding, other orders may be used. The VMM 34 and/or the DSM 38 may comprise instructions which, when executed on one or more of the computers 10A-10M, implement the operation shown in FIG. 5. While operations are discussed as being performed by a specific software module, operations may be moved to any software module in other embodiments.

The VMM 34 may configure the VMM map 50 and the GP2M maps 52 prior to booting the virtual NUMA machine 22 (block 78). In many multiprocessor systems, including many NUMA systems, one processor is designated the bootstrap processor (BSP) that is responsible for initializing the system to be able to run in a "normal" mode. For example, the BSP may load basic service code, such as operating system kernel code, into memory. The virtual NUMA system 22 may identify any desired processor as the BSP (block 80). Processors that are not the BSP (referred to as application processors (APs)) remain in a wait state until the BSP has completed initializing the system. In one embodiment, the BSP may be a processor in the computer that is the home node for the lowest guest physical address (guest physical address zero). If more than one processor is included in the computer, the BSP may be the lowest-numbered processor in that computer.

Among other things, the BSP (executing operating system boot code) may use the SRAT 44 to determine a local memory space, and may load the operating system code to the local memory (block 82).

The BSP may then "awaken" the APs, including processors on other computers 10A-10M (block 84). For example, the BSP may signal an interrupt to each AP to cause it to awaken and begin executing code. As another example, the BSP may write a memory location being polled by the APs with a value that indicates that the APs may awaken. The APs that are on other computers than the BSP may experience page faults for the code that the BSP loaded into local memory on its computer, and the DSM 38 may fetch the pages and cache them locally for execution by the APs in the other computers (block 86).

Figure 6:
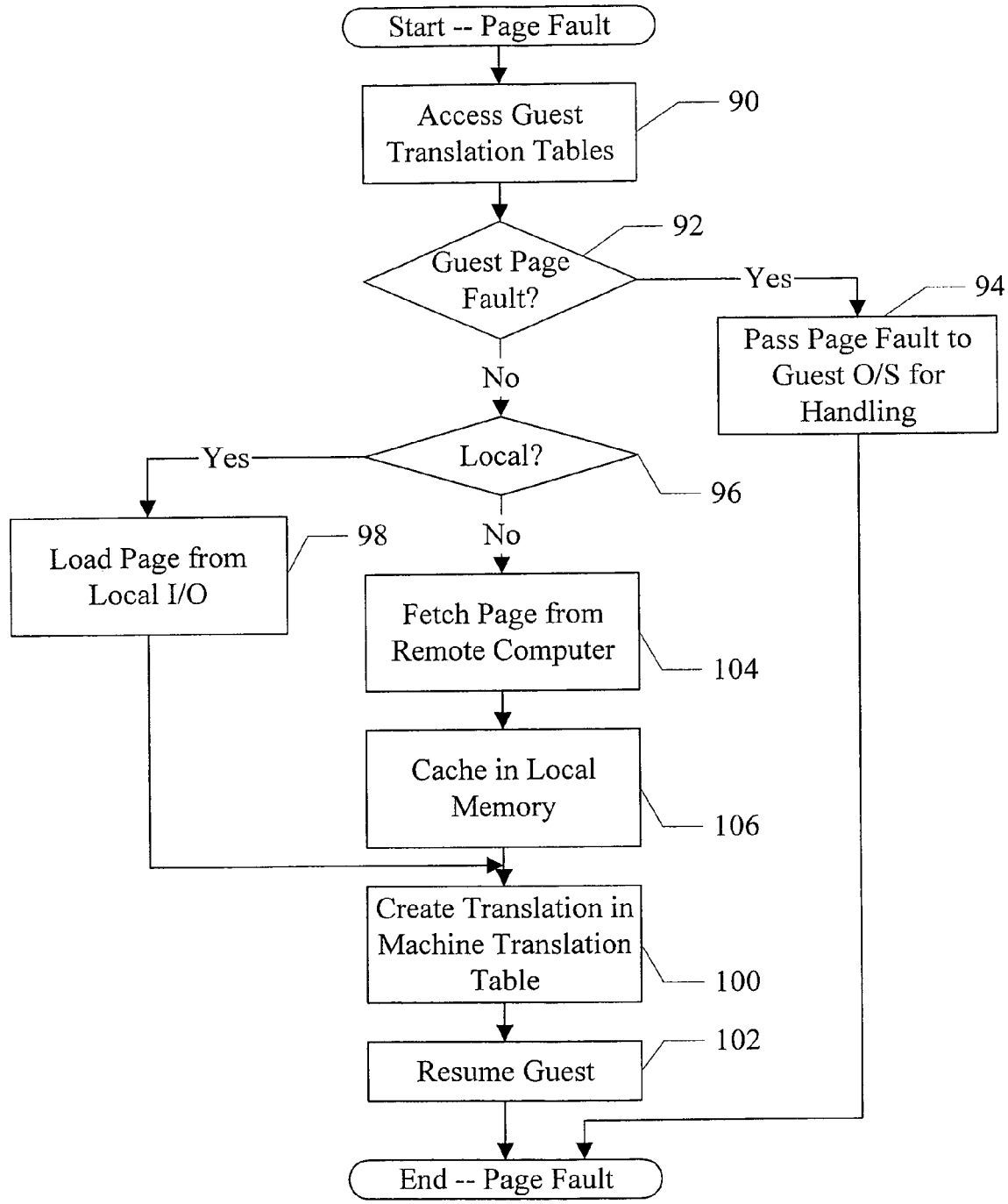
FIG. 6 is a flowchart illustrating one embodiment of page fault handling.

FIG. 6 is a flowchart illustrating operation of one embodiment of the page fault handler 36 and the DSM 38 in response to a page fault from the guest operating system 32. The page faults may be signalled during the boot process on computers other than the computer including the BSP, or may be page faults that occur during normal operation. While the blocks are shown in a particular order for ease of understanding, other orders may be used. The page fault handler 36 and/or the DSM 38 may comprise instructions which, when executed on one or more of the computers 10A-10M, implement the operation shown in FIG. 6. It is noted that, while specific operations are described below as being performed by the page fault handler 36 or the DSM 38, other implementations may move operations between the page fault handler 36, the DSM 38, and/or any other software module, as desired.

The page fault handler 36 may access the guest translation tables 46 to determine whether or not the page fault is a guest page fault (block 90). A guest page fault may be a page fault that occurs because there is no mapping in the guest translation tables 46 for the virtual address that caused the page fault. That is, the guest operating system 32 has not allocated a guest physical page for the virtual page, or previously had invalidated the translation (e.g. to reclaim the guest physical page for another translation). On the other hand, non-guest page faults may occur if a guest physical page has been allocated, but the mapping of guest physical address to machine address has not been established or has been invalidated by the page fault handler 36. Either type of page fault may cause the machine translation tables 48 to be updated to establish the guest virtual address to machine address translation used by the computer hardware.

If the page fault is a guest page fault (decision block 92, "yes" leg), the page fault handler 36 may pass the page fault back to the guest operating system 32 as a guest page fault (arrow 54 in FIG. 2, block 94). The guest operating system may allocate a guest physical page for the virtual page for which the fault was detected, and may update the guest translation tables 46 to establish the translation. In one embodiment, after the guest operating system 32 restarts the instruction that caused the page fault, another page fault may be detected (since the machine translation tables 48 have not been updated). On the second occurrence of the page fault, the page fault handler 36 may detect that the page fault is not a guest page fault, and may handle the page fault and update the machine translation tables 48. In other embodiments, the page fault handler 36 may monitor the allocation of the guest physical page and may establish a corresponding translation in the machine translation tables 48 in response to the first page fault (e.g. by trapping accesses to the guest page tables).

If the page fault is not a guest page fault (decision block 92, "no" leg), the page fault handler 36 may determine if the guest physical address is a local guest physical address (decision block 96). The VMM map 50 may include the information indicating which guest physical addresses are local and which are not, for example. If the guest physical address is local (decision block 96, "yes" leg), the page fault handler 36 may perform the local I/O operations to load the missing guest physical page (block 98), and may create the translation from the guest virtual page to the local memory page in the machine translation tables 48 (block 100). The VMM 34 may then resume the guest operating system 32, which may restart the instruction that experienced the page fault and thus continue guest execution (block 102). In other embodiments, the local guest physical address to machine address mapping is static, and no local page fault may occur except for coherency purposes, as described in more detail below.

If the guest physical address is remote (decision block 96, "no" leg), the page may be fetched from the remote computer (block 104). For example, the page fault handler 36 may generate the remote page request (arrow 56 in FIG. 2) to the DSM 38, which may read the page from the remote computer. The DSM 38 may also participate in any coherency handling that may be required to read the page. The DSM 38 may allocate a cache page in the local memory, and may cache the remote page in the allocated local memory page (block 106). The page fault handler may create the translation in the machine translation tables 48, and resume the guest (blocks 100 and 102).

Figure 7:
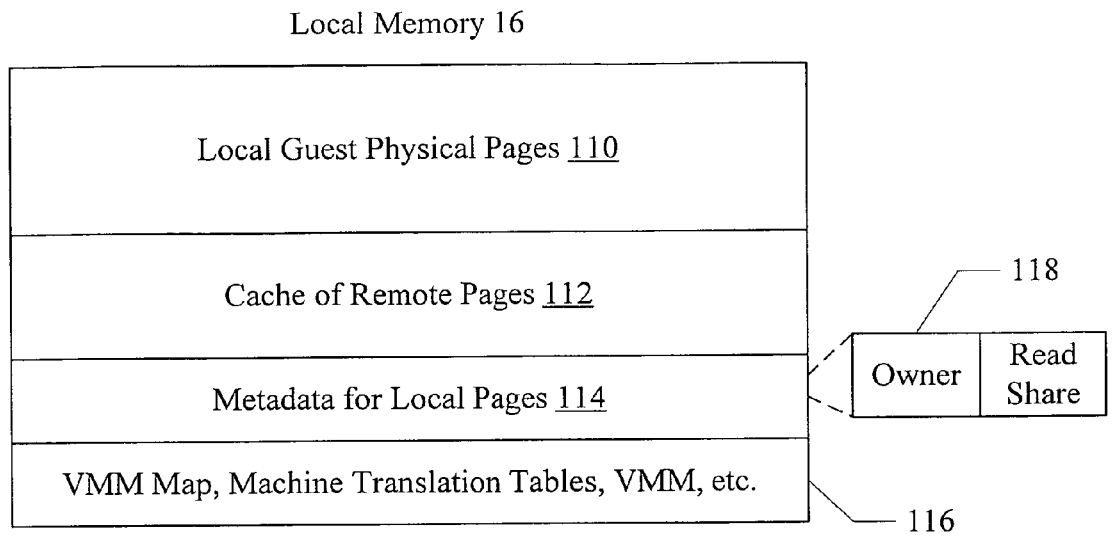
FIG. 7 is a block diagram illustrating one embodiment of a local machine memory.

Turning now to FIG. 7, an exemplary layout of the local memory 16 in a computer 10A-10M for one embodiment is shown. Any layout may be used, including moving the various memory regions shown in FIG. 7 relative to each other. As illustrated in FIG. 7, portions of the local memory are allocated to local guest physical pages 110, a cache of remote pages 112, metadata for local pages 114, and various local code and data structures 116.

The local guest physical pages 110 are the pages for which the computer is the home node, and the cache of remote pages 112 may be managed by the DSM 38 as mentioned above (and may correspond to the cache 68 shown in FIG. 4). The local code and data structures 116 may include the VMM 34 (including the page fault handler 36), the DSM 38, the machine translation tables 48, the VMM map 50, the GP2M map 52A, the ICM 40, the network drivers 42, etc. That is, the local code and data structures 116 may comprise the code and data structures used to present the virtual NUMA system 22 to the guest operating system 32 (and the applications 30). The metadata for local pages 114 may comprise data that is used by the DSM 38 on each computer to manage the coherency of the local guest physical pages. That is, the metadata describes the current state of each page, so that coherent access to that page may be performed according to the coherency scheme implemented in the virtual NUMA system 22. In one embodiment, the coherency scheme may include a single writer, multiple reader memory model with weak ordering. The single writer, multiple reader model is one in which at most one node may be permitted to write a page at any given point in time. If another node generates a write to the page, the previous writer permits the transfer of the page to the new writer (directly or indirectly through the home node). On the other hand, multiple nodes may read the page concurrently (and may cache copies locally to permit such reads). The weak ordering may refer to the order that reads and writes to the same pages are observed from different nodes. Weak ordering may permit a read and a write to be observed in different orders from different nodes as long as a synchronization operation has not been performed between the read and write. Other embodiments may implement other ordering models (e.g. strong ordering).

In one embodiment, the coherency protocol may include an ownership-based mechanism in which any node may become the owner of the page (and thus may write the page) and in which other nodes may become sharers of the page. The metadata for each page may thus include an indication of the owner of the page and an indication of the read sharers. For example, metadata 118 is shown for a particular page, including an owner field and a read share field. The owner field may store an indication of the owner (e.g. a node number). The owner may be the home node by default, and may be changed as other nodes acquire ownership (e.g. to write the page). The read share field may indicate the sharers. In one embodiment, the read share field may be a flag which may indicate, in one state, that there are no read sharers and may indicate, in another state, that there is at least one sharer. The flag may be a bit which may be set to indicate at least one sharer and clear to indicate no sharers, or vice-versa. In other embodiments, the read share field may be a bit vector that identifies each sharer, or another indication that identifies each sharer (e.g. a list of node numbers).

There may be one metadata 118 for each local guest physical page (or block, if coherency is maintained at a different granularity than translation). The metadata for a given page may be located within the metadata 114 at an offset assigned to that local guest physical page, where the offset may be calculated from the guest physical address.

In various embodiments, coherency may be maintained for the guest physical pages using any desired communication on the network 12. For example, the DSMs 38 on each computer may exchange messages on the network 12 to determine ownership, transfer ownership, and transfer the data between the computers. Since the DSMs 38 are software modules, their execution interrupts the execution of the virtual machine on each computer involved in the coherent transfer of a page. In one embodiment, the DSMs 38 may use RDMA transfers to minimize the interruption of computers. Particularly, the DSMs 38 may use RDMA transfers to minimize interruption of the home node for a given physical page involved in a coherent transfer.

The boot sequence for each computer (e.g. as illustrated in the flowchart of FIG. 5) may further include each node registering memory regions to which RDMA access is permitted. The registration may be performed with the network interface device 20. That is, the registration may provide the network interface device 20 with the ranges of memory to which RDMA is permitted. In an embodiment in which the network 12 is compatible with InfiniBand, the registration may include assigning a key and a queue pair for the memory region, and exchanging the key and queue pair with other computers to which RDMA access to local memory is to be provided. RDMA may be implemented in other fashions on other networks, and any RDMA implementation may be used. Generally, RDMA may permit a remote computer to read and/or write local memory in a local computer without software assistance on the local computer during the transfer.

The memory regions registered for RDMA access may include the local guest physical pages 110 (to permit read and write of the data in the home node) and the metadata 114 (to permit the read and write of metadata by the remote nodes). Particularly, in one embodiment, the remote nodes that are transferring ownership or reading the local guest physical pages 110 may directly update the metadata, thus tracking the ownership and coherency of the local guest physical pages without interrupting the home node.

Turning next to FIGS. 8-12, flowcharts are shown illustrating operation of one embodiment of the DSMs 38 on computers 10A-10M to handle reads, writes, and other operations to maintain coherency in the virtual NUMA system 22, and in which RDMA is used to perform at least some of the transfer. Other embodiments may not use RDMA, if desired.

Reads to remote pages that are cached locally (read hits) and writes to owned pages (write hits) may occur without interruption by the DSMs 38 and/or the VMM 34. Reads to remote pages that are not cached locally (read misses), writes to pages that are not owned are interrupted to perform the coherent transfer of the remote pages to the local cache 112.

Figure 8:
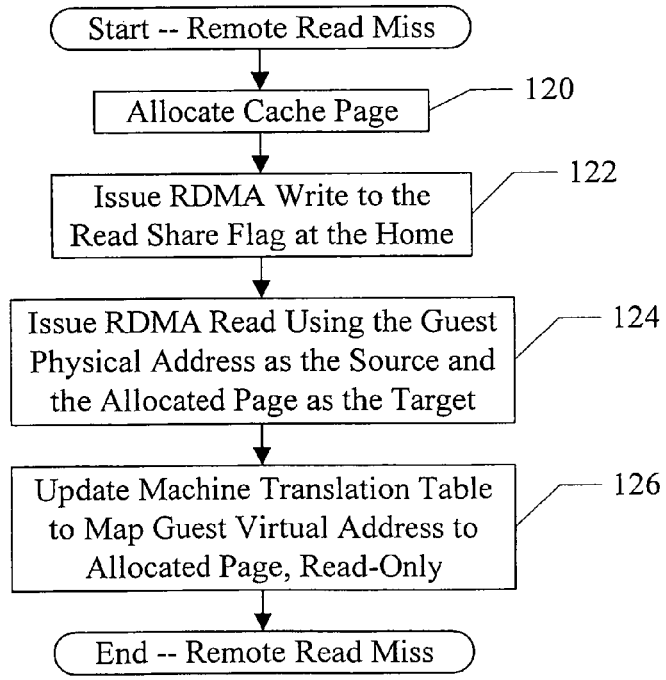
FIG. 8 is a flowchart illustrating one embodiment of remote read miss handling.

FIG. 8 is a flowchart illustrating operation of one embodiment of the DSM 38 in response to a remote read miss. While the blocks are shown in a particular order for ease of understanding, other orders may be used. The DSM 38 and/or the page fault handler 36 may comprise instructions which, when executed on one or more of the computers 10A-10M, implement the operation shown in FIG. 8. A remote read miss may be signalled by the page fault handler 36 as a remote page request, as illustrated in FIG. 2, in one embodiment. It is noted that, while specific operations are described below as being performed by the page fault handler 36 or the DSM 38, other implementations may move operations between the page fault handler 36, the DSM 38, and/or any other software module, as desired.

The DSM 38 may allocate a cache page (that is, a page in the cache of remote pages 112) to store the data from the remote page (block 120). The DSM 38 (or other code) may operate in the background to ensure that there is a cache page available for allocation at any given point in time. Alternatively, the DSM 38 may be configured to evict a previously stored page (including invalidating the translation lookaside buffers TLBs in any processors in the computer, invalidating the translation in the machine page tables 48, and writing a modified (dirty) page back to the home node). The DSM 38 may also issue an RDMA write to the home node, to the metadata for the remote page, to set the read share flag for the page (block 122). The DSM 38 may calculate the address of the read share flag using the guest physical address of the page. Note that, in this embodiment, the read share flag is updated without first reading the flag to check its state. Other embodiments may read the metadata prior to updating it. The DSM 38 may issue an RDMA read to the home node to read the remote page (block 124). The RDMA read may use the guest physical address of the remote page as the source address, and the home node's network interface device 20 may translate the guest physical address to the corresponding local memory address. The address of the allocated page in the cache 112 may be used as the target address of the RDMA read operation. Accordingly, the metadata for the remote page is updated at the home node and the data is read from the home node without interrupting instruction execution in the home node. When the RDMA read is completed, the DSM 38 may update the machine translation tables 48 to map the guest virtual address that caused the page fault to the allocated page in the cache 112 (block 126). The page may be marked read-only in the translation tables. Accordingly, if a subsequent write is attempted to the page, a page fault will be signalled and ownership of the page may be obtained.

It is noted that an invalidate of the page may be received while the DSM 38 is performing the above operations. In one embodiment, the page may not be marked as valid in the machine translation tables 48 in such a case.

Figure 9:
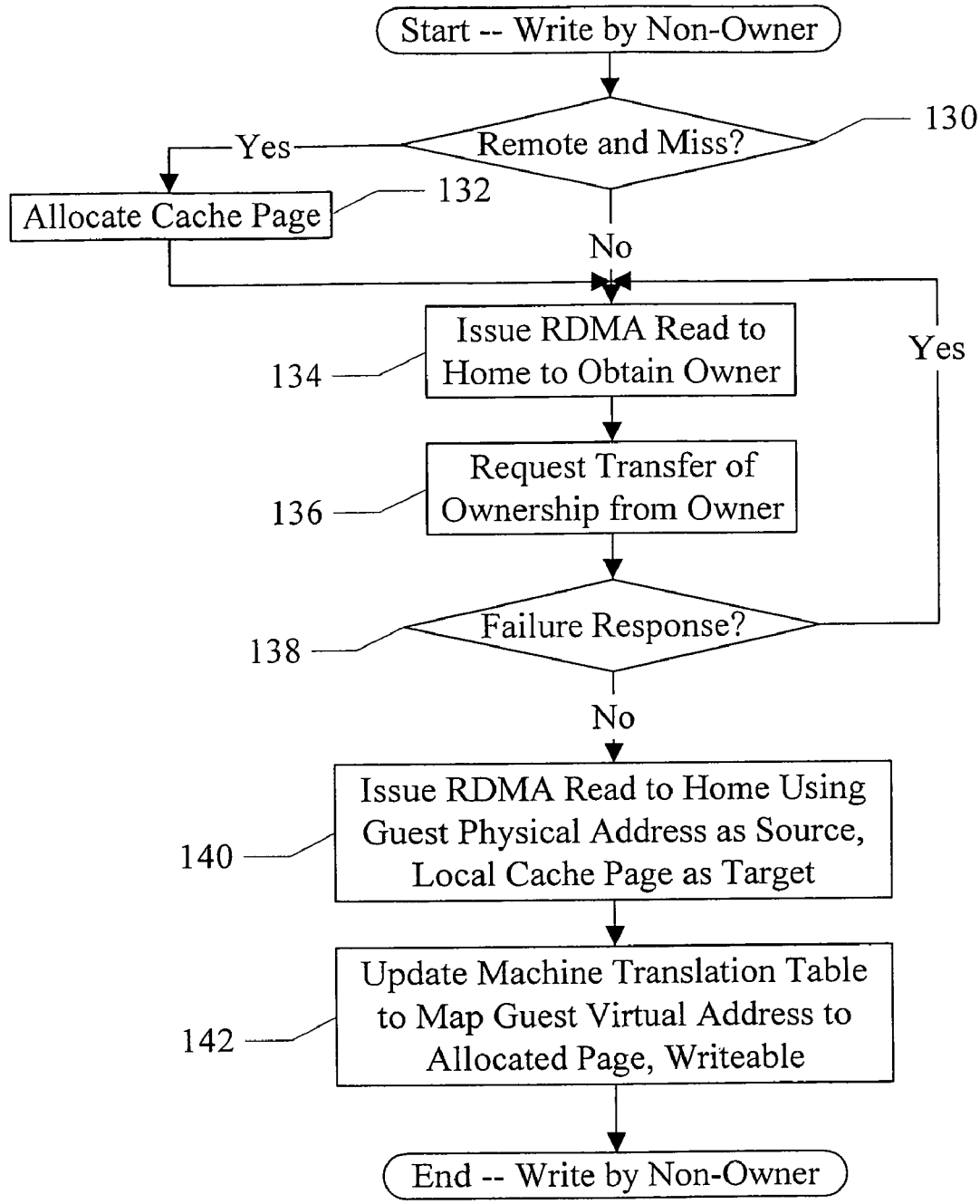
FIG. 9 is a flowchart illustrating one embodiment of non-owner write handling.

Turning next to FIG. 9, a flowchart is shown illustrating operation of one embodiment of the DSM 38 in response to a write by a non-owner. FIG. 9 may illustrate operation for remote write misses, as well any write to a page that is not owned locally. While the blocks are shown in a particular order for ease of understanding, other orders may be used. The DSM 38 and/or the page fault handler 36 may comprise instructions which, when executed on one or more of the computers 10A-10M, implement the operation shown in FIG.

9. A write by a non-owner may be signalled by the page fault handler 36 as a remote page request, as illustrated in FIG. 2, in one embodiment. Remote writes that miss cause a page fault because no translation is found in the machine translation tables 48, while writes to pages that are not locally owned cause a page fault because either no translation is found or the page is marked read-only. It is noted that, while specific operations are described below as being performed by the page fault handler 36 or the DSM 38, other implementations may move operations between the page fault handler 36, the DSM 38, and/or any other software module, as desired.

If the write is to a remote page and is a miss in the local cache 112 (decision block 130, "yes" leg), the DSM 38 may allocate a cache page to store data from the remote page (block 132). If the write is to a local page, no cache page is needed and if the write is to a remote page that hits, but is read only, the same cache page may be used to store the updated data from the owner. In either case, the DSM 38 may issue an RDMA read to the home node to read the owner field of the metadata for the page to be written. If the page is local, a memory read of the metadata may be performed (block 134). The DSM 38 may transmit a message to the owner to request a transfer of ownership (block 136). The DSM 38 on the owner node may return a response to the request, either indicating success or failure. If failure is indicated (decision block 138, "yes" leg), the DSM 38 may repeat the RDMA read to determine the owner (in case the DSM 38 on the owner node failed the ownership transfer because another ownership transfer was already in progress-block 134) and may issue another request for transfer of ownership (block 136).

If success is indicated (decision block 138, "no" leg), the DSM 38 may issue an RDMA read to the home node to read the remote page (block 140). The source address of the RDMA read is the guest physical address, and the target address may be the local cache page. Once the RDMA read is complete, the DSM 38 may update the machine translation tables 48 with a translation of the guest virtual address of the write to the local cache page address, and may mark the page as writeable (block 142). Again, the home node may not be interrupted for the write, unless the home node is also the owner.

In one embodiment, the ownership information for a given page may be cached in a node that caches that given page. Generally, when a node reads the page from the home node, it may also read the metadata for that page to capture the current owner. If the caching node becomes aware of a new owner, it may update the cached ownership information. The caching node may use the cached ownership information to request an ownership transfer if the caching node is attempting to become the owner, eliminating the read of the home node to determine the owner. In some cases, the cached owner information may become stale. If the cached ownership information is stale, the node from which the ownership transfer was requested may return a failure response to the ownership transfer request (because it is no longer the owner, as mentioned above), and thus the requesting node may proceed to read the ownership information from the home node, also as described above. Alternatively, the node that returns the failure response may have cached ownership information, and may return that ownership information with the failure response.

Figure 10:
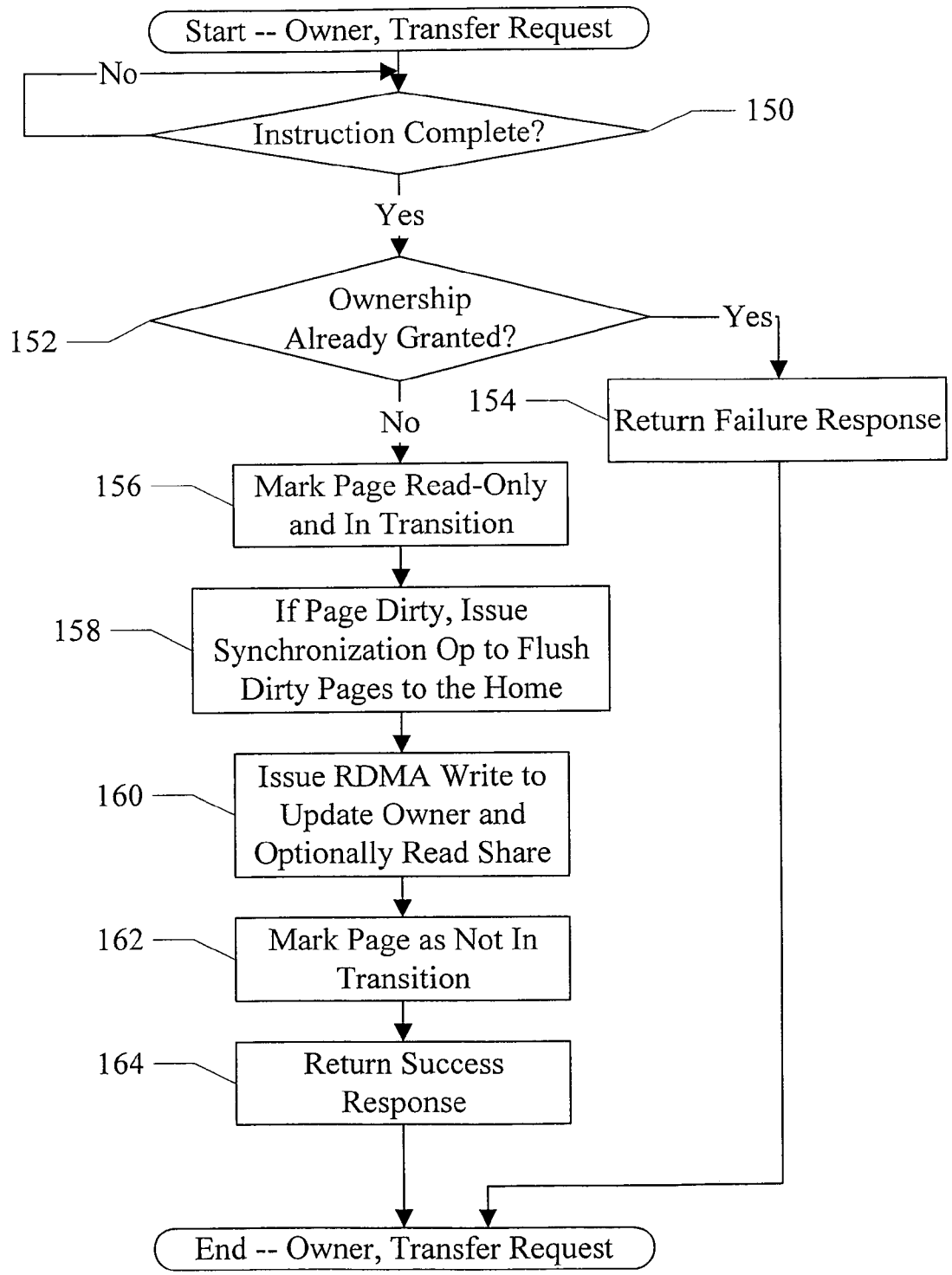
FIG. 10 is a flowchart illustrating one embodiment of an owner in response to a transfer of ownership request.
Figure 11:
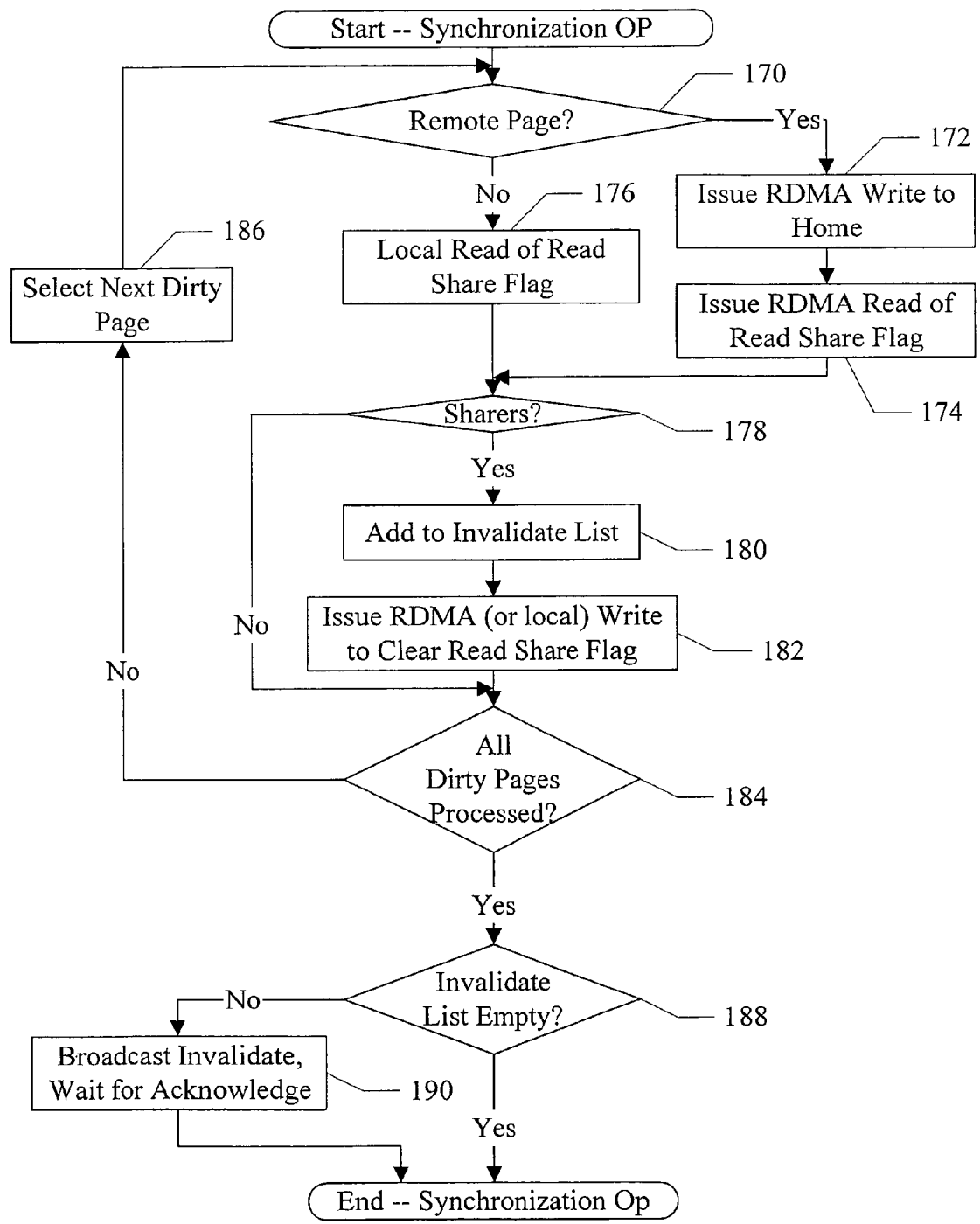
FIG. 11 is a flowchart illustrating one embodiment of a synchronization operation.

Turning now to FIG. 10, a flowchart is shown illustrating operation of one embodiment of the DSM 38 in an owner node in response to an ownership transfer request by a non-owner. While the blocks are shown in a particular order for ease of understanding, other orders may be used. The DSM 38 and/or the page fault handler 36 may comprise instructions which, when executed on one or more of the computers 10A-10M, implement the operation shown in FIG. 10. The operation of FIG. 10 may be initiated in response to the reception of a ownership transfer request message from the requestor. That is, the receipt of the message may cause the computer that represents the owner node to execute its DSM 38. It is noted that, while specific operations are described below as being performed by the page fault handler 36 or the DSM 38, other implementations may move operations between the page fault handler 36, the DSM 38, and/or any other software module, as desired.

The DSM 38 may check to ensure that at least one instruction has been executed while the owner node has ownership of the requested page (decision block 150). This check may ensure that ownership is not repeatedly transferred without each owner making progress on the instructions that cause the ownership transfer. For example, the translation in the machine translation tables 48 may include a reference bit indicating whether or not the page has been accessed by the processor(s), and the DSM 38 may check the reference bit to ensure that the instruction has been completed. If the instruction has not completed (decision block 150, "no" leg), the DSM 38 may delay further operation to permit the instruction to complete. If the instruction has completed (decision block 150, "yes" leg), the DSM 38 may determine if ownership has already been granted to another node than the requesting node (e.g. the owner node is no longer the owner, or an ownership transfer is already in progress—decision block 152). If ownership has been granted (decision block 152, "yes" leg), the DSM 38 may return a failure response to the requesting node (block 154).

If ownership has not been granted (decision block 152, "no" leg), the DSM 38 may mark the page as read-only (to prevent further updates) and in transition (to prevent grant of ownership to a different requestor concurrently) (block 156). Changing the page to read-only may also include invalidating the TLBs in the processors within the computer as well, since the TLBs may be caching the write permission for the page. If the page is dirty, the DSM 38 may issue a synchronization operation to flush dirty pages to the home node(s) of those pages (block 158). This synchronization may ensure that the writes performed by the owner node to the page and to other pages are observed in order. The synchronization operation is discussed in more detail below for one embodiment with respect to FIG. 11. The DSM 38 may issue an RDMA write to update the owner field of the metadata corresponding to the page, indicating that the requestor is now the owner (block 160). If the (now previous) owner is the home node, the read share flag need not be updated. However, if the (now previous) owner is not the home node, the DSM 38 may also update the read share flag since the node retains a copy of the page. The DSM 38 may mark the page as not in transition (block 162) and may return a success message to the requester (block 164).

As highlighted above, an owner node may perform a synchronization operation in response to an ownership transfer request, if the block (page) targetted by the request is modified (or "dirty"). The synchronization operation may ensure that the previous writes performed by the owner node (in the targetted page as well as any other pages that are dirty) are visible to all other nodes in the system, thus ensuring that the weakly ordered memory model is maintained properly. In one embodiment, the writes are made visible by flushing the dirty pages to their home nodes, and possibly invalidating copies of the pages in other nodes, if any.

In some processor architectures, synchronization instructions are not privileged. The instructions are referred to by various names (e.g. sync, acquire, release, fence, memory barrier, etc.). Since the synchronization instructions are not privileged, they are difficult for the VMM 34 to detect. Since an ownership transfer of a modified page is treated as synchronization operation; if one write becomes visible, then all writes become visible. If a synchronization instruction was used in the code stream executed by the owner node, the writes become visible concurrently and thus the weak ordering is maintained. If a synchronization instruction was not used, the ownership transfer could have been performed without the synchronization operation. However, correct operation still occurs in this case even if the synchronization operation is performed.

As an example, the Intel Architecture (IA-32, also known as x86) may support weak ordering based on release consistency. Synchronization accesses are annotated as acquire, release, or fence. Other instruction set architectures may be used that support weak ordering and which do not easily permit the VMM 34 to detect the synchronization instructions.

Turning now to FIG. 1, a flowchart is shown illustrating operation of one embodiment of the DSM 38 in an owner node to perform a synchronization operation. While the blocks are shown in a particular order for ease of understanding, other orders may be used. The DSM 38 and/or the page fault handler 36 may comprise instructions which, when executed on one or more of the computers 10A-10M, implement the operation shown in FIG. 11. It is noted that, while specific operations are described below as being performed by the page fault handler 36 or the DSM 38, other implementations may move operations between the page fault handler 36, the DSM 38, and/or any other software module, as desired.

If the page that causes the synchronization operation is a cached copy of a remote page (decision block 170, "yes" leg), the DSM 38 may issue an RDMA write to the home node to write the page back to the home node (block 172). The destination address of the RDMA may be the guest physical address of the remote page. The DSM 38 may also issue an RDMA read to read the read share flag from the home node (block 174). On the other hand, if the page is a local guest physical page (decision block 170, "no" leg), the DSM 38 may read the read share flag from the local metadata (block 176). In either case, if the read share flag indicates that one or more sharers may have a copy of the page (decision block 178, "yes" leg), the DSM 38 may add the page to an invalidate list (block 180) and issue an RDMA write to the home node (or a local write if the DSM 38 is executing on the home node) to clear the read share flag (block 182). In other embodiments, the read of the read share flag may not be used. In such embodiments, the page may be added to the invalidate list and the RDMA write to clear the read share flag may be issued. Such embodiments may eliminate the round trip latency of the RDMA read. If more dirty pages remain to be processed (decision block 184, "no" leg), the DSM 38 may select the next dirty page (block 186) and repeat blocks 170-184 for the newly selected dirty page. Once the dirty pages have been processed (decision block 184, "yes" leg), the DSM 38 may determine if the invalidate list is empty (decision block 188). If not (decision block 188, "no" leg), the DSM 38 may broadcast an invalidate message (or invalidate request) to each other computer 10A-10M with the list of pages to invalidate, and may wait for acknowledgement from each other computer 10A-10M (block 190). In other embodiments, the DSM 38 may not await the acknowledgements before completing the synchronization operation. The requesting node (that receives the ownership) may await the completion of the local invalidates associated with the synchronization operation before declaring itself the owner, to avoid accessing stale data.

Figure 12:
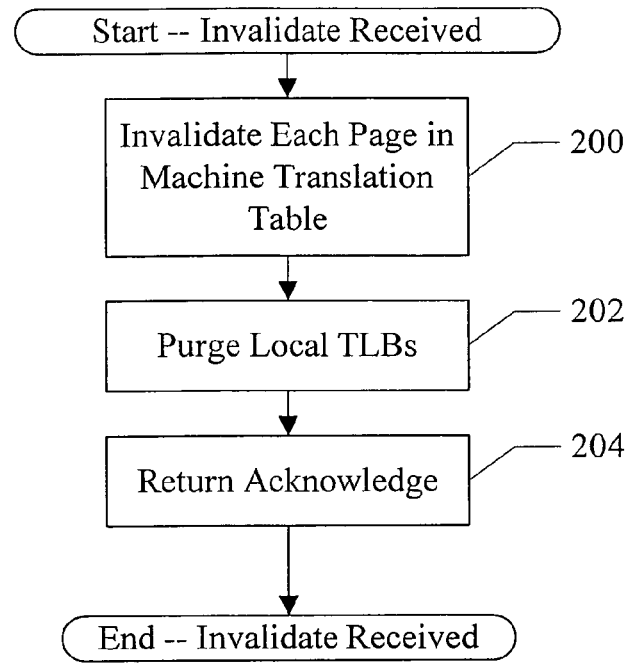
FIG. 12 is a flowchart illustrating one embodiment of responding to an invalidate request.

FIG. 12 is a flowchart illustrating operation of one embodiment of the DSM 38 in any computer 10A-10M in response to receiving an invalidate message. The receipt of an invalidate message in the computer 10A-10M may cause the computer 10A-10M to execute the DSM 38 to process the invalidate message. While the blocks are shown in a particular order for ease of understanding, other orders may be used. The DSM 38 and/or the page fault handler 36 may comprise instructions which, when executed on one or more of the computers, 10A-10M, implement the operation shown in FIG. 12. It is noted that, while specific operations are described below as being performed by the page fault handler 36 or the DSM 38, other implementations may move operations between the page fault handler 36, the DSM 38, and/or any other software module, as desired. The DSM 38 may invalidate each page listed in the invalidate message in the machine translation tables 48 (block 200), purge the translations from the local TLBs (block 202), and return an acknowledgement to the node that issued the invalidate message (block 204).

It is noted that, in some embodiments, the owner may transfer the page to the requestor, rather than writing it back to the home node (as part of the synchronization operation) and having the requestor read it from the home node, as described above. In one implementation of such an embodiment, the cache pages may be preregistered for RDMA access, similar to other pages. When an ownership transfer is requested, the requesting node may provide the page frame number of the physical page that will cache the requested page. When the (previous) owner transfers the page, it may perform an RDMA write to directly write the data to the requesting node's cache, which may eliminate a local page copy in the requesting node to copy the data from an inbound receiving buffer (e.g. mailbox) to the cache page location. It is further noted that, in some embodiments, the transfer of a dirty page may not cause synchronization.

It is noted that, in some embodiments, a given computer 10A-10M may correspond to more than one node in the virtual NUMA system 22. Similarly, in some embodiments, a given node in the virtual NUMA system 22 may be spread across two or more computers 10A-10M.

Figure 13:
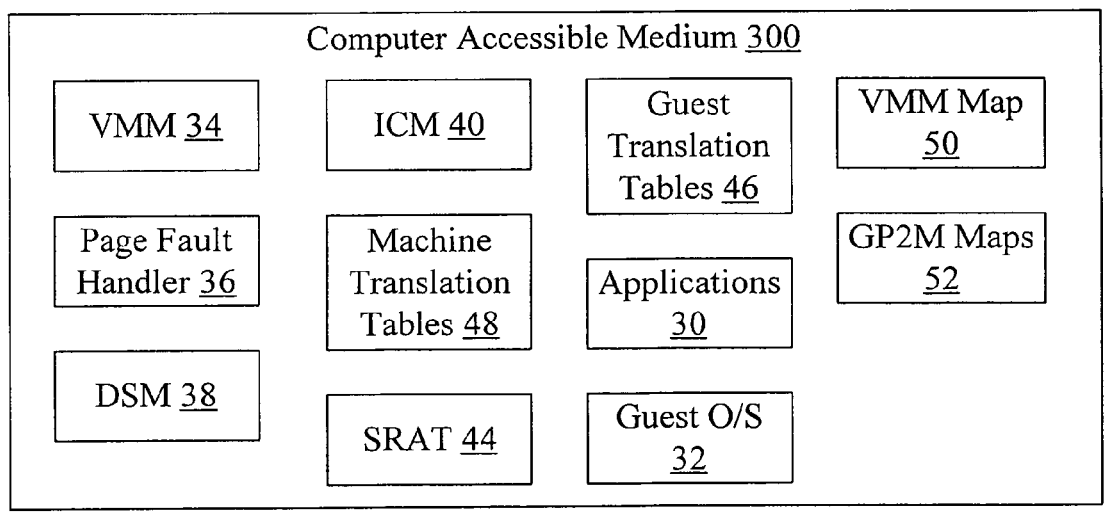
FIG. 13 is a block diagram of one embodiment of a computer accessible medium.

Turning next to FIG. 13, a block diagram of a computer accessible medium 300 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), as well as media accessible via transmission media or signals such as electrical, electromagnetic, or digital signals, conveyed via a communication medium such as a network and/or a wireless link. The computer accessible medium 300 in FIG. 13 may store one or more of the VMM 34, the page fault handler 36, the DSM 38, the ICM 40, the machine translation tables 48, the SRAT 44, the guest translation tables 46, the applications 30, the guest operating system 32, the VMM map 50, and/or the GP2M maps 52. Generally, the computer accessible medium 300 may store any set of instructions which, when executed, implement a portion or all of the flowcharts shown in one or more of FIGS. 5, 6, 8, 9, 10, 11, and 12. The computer accessible medium 300 may comprise one or more media in each computer 10A-10M, in some embodiments.

Turning now to FIGS. 14-20, an example of the use of synchronization operations for one embodiment is shown. FIG. 14 is an exemplary pseudo-code sequence that is often used to control entrance to critical sections of code (e.g. sections that update shared data) when a weakly ordered memory model is implemented. Generally, such sequences may be used to test and update a semaphore (a lock, in this example). If the semaphore indicates that entrance to the critical section is permitted and the code sequence successfully updates the semaphore (acquiring the lock), the critical section can be entered. The critical section is exited by unlocking the semaphore (releasing the lock). In FIG. 14, the statement "Lock X" refers to testing the variable X for the unlocked state, and establishing the lock state in the variable X if the unlocked state is detected. If the unlocked state is not detected, or the lock state is not successfully established, the lock repeats. In this example, the critical section comprises an update (write) to variable Y. The "Unlock X" statement refers to writing the unlocked state to the variable X. Variables X and Y are in different pages (different blocks).

FIGS. 15-20 illustrate an example of two nodes (N2 and N3) executing the sequence shown in FIG. 14. Node N1 is the home node for both X and Y. In the figures, the state of the pages containing X and Y are shown within the nodes. The state shown is the state at the completion of the step shown in that figure, including after the completion of any internode communications shown in that figure. For brevity in the example, the description below refers to "owning X" or "owning Y" (or various derivatives thereof or other states thereof, such as shared, clean, etc.). Such references refer to the page containing X or Y.

Beginning with FIG. 15, the N2 initially owns both X and Y and N3 has X and Y in the shared state. N1 is the home node of X and Y, as mentioned previously. N2 successfully performs the lock of X, and thus the state of X in N2 is owned and dirty, denoted as "(O, D)". The state of Y in N2 remains owned and clean, denoted as "(O, C)". In node N3, the state of X is still shared, but the copy in N3 is stale, denoted "(S, St)". The state of Y in N3 is shared and clean, denoted "(S, C)".

In FIG. 16, N3 attempts to lock X. The lock operation includes an update, and so N3 requests an ownership transfer from N2 (illustrated as the Owner Xfer for X in FIG. 16, arrow 210). In response to the ownership transfer request, and having a dirty copy of X, N2 performs a synchronization operation. X is the only dirty page in this example, so it is flushed to home node N1 (arrow 214) and an invalidate X message is broadcast (arrow 212). Once the ownership transfer is complete, N2 replies success to N3, and N3 reads X from the home node N1 (arrow 216). Thus, N3 has X in the owned and dirty state (and the lock operation fails, since N2 still holds the lock). That is, the attempt to lock may still dirty the page, even though the attempt fails. For example, a test and set type of lock may write the set state, and then compare the set state to the previous value to see if the lock was successful. Other locks may be implemented as an increment or decrement and check the value for negative/positive. In such cases, the data has been changed even though the lock attempt was unsuccessful. N2 has X in the shared and stale state, and also has Y in the owned and clean state. The home node has a clean copy of X as well.

In FIG. 17, N3 again attempts to lock X, but again fails since N2 has not yet unlocked X. However, since N3 has an owned copy of X, no communication between nodes is needed. Generally, no communication will be needed until N2 attempts to unlock X. If more nodes were included and were contending for the lock of X, those nodes would thrash on X. However, since those nodes cannot make forward progress without the lock, the thrash has little effect on the performance of those nodes.

Additionally, N2 updates Y in FIG. 17. Since Y is owned by N2, no communication is needed and the final state of Y is owned and dirty in FIG. 17.

Figure 18:
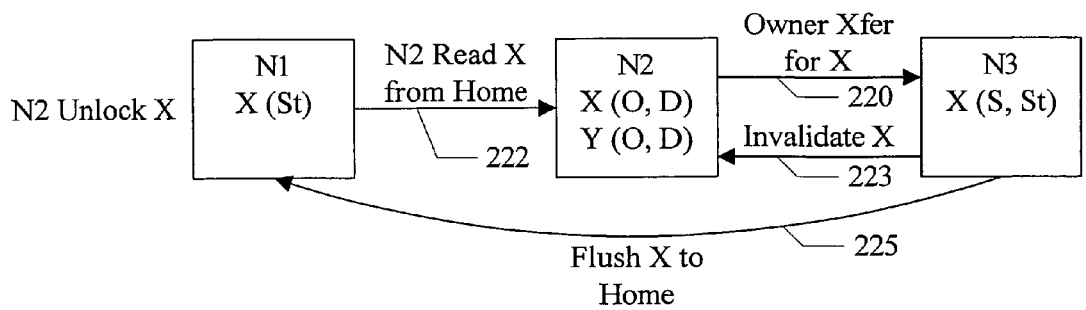
Figure 19:
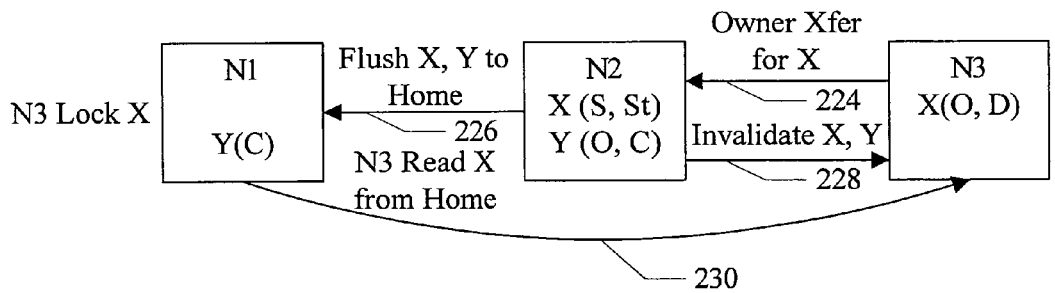

Next, N2 performs the unlock of X (FIG. 18). Since X is not owned by N2, N2 requests ownership from N3 (arrow 220). N3 has X in the owned and dirty, so a synchronization operation is needed. N3 transmits an invalidate for X (arrow 223) and flushes X to the home node (arrow 225). N3 returns success, and N2 reads X from the node N1 (arrow 222). Thus, the final state of X in N2 is owned and dirty, as is the state of Y in N2. The final state of X in N3 is shared and stale.

As shown in FIG. 19, N3 again attempts to lock X. N3 issues a request to transfer ownership of X to N2 (arrow 224), which detects that it has X in the dirty state. Thus, N2 issues a synchronization operation. Both X and Y are dirty in this case, and so both X and Y are flushed to the home node N1 (arrow 226) and invalidates for both X and Y are transmitted (arrow 228). N3 reads X from the home node (arrow 230), and succeeds in establishing the lock. The final state of X in N2 is shared and stale, and the final state of Y is owned clean. N1 has a clean copy of Y, and N3 has an owned and dirty copy of X.

Figure 20:
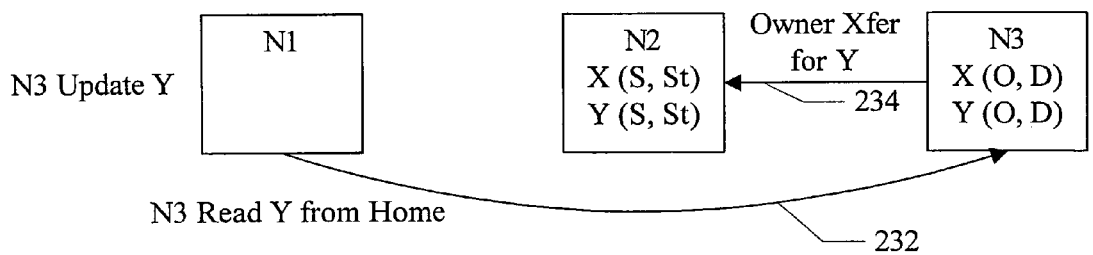

In FIG. 20, N3 updates Y. N3 obtains ownership of Y from N2 (arrow 234) and reads Y from N1 (arrow 232). Thus, the final state of Y in N3 is owned and dirty, and the final state of Y in N2 is shared and stale. The updates to Y made by N2 are thus preserved, to the extent that they are not overwritten by N3.

Numerous variations and modifications will become apparent to those skilled in the art once the above disclosure is fully appreciated. It is intended that the following claims be interpreted to embrace all such variations and modifications.

What is claimed is:

1. A system comprising:
   a plurality of computers coupled to a network, wherein each of the plurality of computers comprises one or more software modules which, when executed on the computer, present resources of the plurality of computers as a virtual machine;
   wherein the virtual machine is a non-uniform memory access (NUMA) machine comprising a plurality of nodes, each node having memory that is part of a distributed shared memory, and wherein the virtual machine is coherent with a weakly ordered memory model; and
   wherein the one or more software modules, are executable in a current owner node of a first block in response to an ownership transfer request from a requesting node of the plurality of nodes for the first block, wherein the ownership transfer request is a request to transfer ownership of the first block from the current owner node to the requesting node, wherein the one or more software modules, when executed:
   determine that the first block has been modified in the current owner node; and
   perform a synchronization operation in response to determining that the first block is modified in the current owner node, wherein the synchronization operation comprises determining each other modified block in the memory of the current owner node and wherein the synchronization operation further comprises writing the first block to a home node of the first block and writing each other modified block in the current owner node to the home node of that modified block in response to detecting that the first block is modified in the current owner node and wherein the first block and each modified block is stored in a separate memory location in the memory of the respective home node of that block.

2. The system as recited in claim 1 wherein the synchronization operation further comprises transmitting an invalidate request to at least one other node of the plurality of nodes that has a shared copy of a modified block.

3. The system as recited in claim 2 wherein the synchronization operation comprises transmitting invalidate requests to each other node.

4. The system as recited in claim 2 wherein the one or more software modules do not check a read share flag corresponding to the modified block prior to transmitting the invalidate requests for the modified block, wherein the read share flag indicates whether or not at least one shared copy of the modified block was provided to another node.

5. The system as recited in claim 2 wherein the other node is configured to return an acknowledgement of the invalidate request, and wherein the one or more software modules, when executed, complete the synchronization operation without waiting for the acknowledgements.

6. The system as recited in claim 1 wherein the block is a page.

7. A computer accessible storage medium storing a plurality of instructions which, when executed on a plurality of computers coupled to a network, present resources of the plurality of computers as a virtual machine, wherein the virtual machine is a non-uniform memory access (NUMA) machine comprising a plurality of nodes, each node having memory that is part of a distributed shared memory, and wherein the virtual machine is coherent with a weakly ordered memory model, and wherein the plurality of instructions, when executed on a first computer of the plurality of computers and the first computer includes a current owner node of a first block, wherein the plurality of instructions are executed in response to an ownership transfer request for the first block received from a requesting node of the plurality of nodes, wherein the ownership transfer request is a request to transfer ownership of the first block from the current owner node to the requesting node, and wherein the plurality of instructions, when executed:

detect that the first block has been modified in the current owner node; and perform a synchronization operation responsive to detecting that the first block has been modified in the current owner node, wherein the synchronization operation comprises determining each other modified block in the memory of the current owner node and wherein the synchronization operation further comprises writing the first block to a home node of the first block and writing each other modified block in the current owner node to the home node of that modified block in response to detecting that the first block is modified in the current owner node, and wherein the first block and each modified block is stored in a separate memory location in the memory of the respective home node of that block.

8. The computer accessible storage medium as recited in claim 7 wherein the synchronization operation further comprises transmitting an invalidate request to at least one other node of the plurality of nodes that has a shared copy of a modified block.

9. The computer accessible storage medium as recited in claim 8 wherein the synchronization operation comprises transmitting invalidate requests to each other node.

10. The computer accessible storage medium as recited in claim 8 wherein the plurality of instructions, when executed to perform the synchronization operation, do not check a read share flag corresponding to the modified block prior to transmitting the invalidate requests for the modified block, wherein the read share flag indicates whether or not at least one shared copy of the modified block was provided to another node.

11. The computer accessible storage medium as recited in claim 8 wherein the other node is configured to return an acknowledgement of the invalidate request, and wherein plurality of instructions, when executed to perform the synchronization operation, complete the synchronization operation without waiting for the acknowledgements.

12. The computer accessible storage medium as recited in claim 7 wherein the block is a page.

13. In a system comprising a plurality of computers coupled to a network, a method comprising:

presenting resources of the plurality of computers as a virtual machine, wherein the virtual machine is a non-uniform memory access (NUMA) machine comprising a plurality of nodes, each node having memory that is part of a distributed shared memory, wherein the virtual machine is coherent with a weakly ordered memory model;

receiving an ownership transfer request for a first block in a current owner node of the first block from a requesting node of the first block, wherein the ownership transfer request is a request to transfer ownership of the first block from the current owner node to the requesting node;

determining that the first block is modified in the current owner node; and responsive to the ownership transfer request and determining that the first block is modified in the current owner node, performing a synchronization operation in the current owner node, wherein performing the synchronization operation comprises determining each other modified block in the memory of the current owner node, and wherein performing the synchronization operation further comprises writing the first block to a home node of the first block and writing each other modified block in the current owner node to the home node of that modified block in response to detecting that the first block is modified in the current owner node, and wherein the first block and each modified block is stored in a separate memory location in the memory of the respective home node of that block.

14. The method as recited in claim 13 wherein performing the synchronization operation further comprises transmitting an invalidate request to at least one other node of the plurality of nodes that has a shared copy of a modified block.

15. The method as recited in claim 14 wherein performing the synchronization operation further comprises transmitting invalidate requests to each other node.

16. The method as recited in claim 14 wherein performing the synchronization operation further comprises not checking a read share flag corresponding to the modified block prior to transmitting the invalidate requests for the modified block, wherein the read share flag indicates whether or not at least one shared copy of the modified block was provided to another node.

17. A computer comprising a memory, execution resources configured to execute instructions, during use, and hardware to couple to a network, wherein the execution resources, during use, execute one or more software modules stored in the memory, wherein the one or more software modules, when executed, configure the computer with other computers coupled to the network to form a virtual machine wherein the virtual machine is a non-uniform memory access (NUMA) machine comprising a plurality of nodes, each node having memory that is part of a distributed shared memory, and wherein the virtual machine is coherent with a weakly ordered memory model; and wherein the one or more software modules, when executed in a current owner node of a first block in response to an ownership transfer request from a requesting node of the plurality of nodes for the first block, wherein the ownership transfer request is a request to transfer ownership of the first block from the current owner node to the requesting node, and wherein the one or more software modules when executed:

detect that the first block has been modified in the current owner node; and perform a synchronization operation in the current owner node responsive to detecting that the first block has been modified in the current owner node and responsive to the ownership transfer request, wherein performing the synchronization operation comprises determining each other modified block in the memory of the current owner node, and wherein performing the synchronization operation further comprises writing the first block to a home node of the first block and writing each other modified block in the current owner node to the home node of that modified block in response to detecting that the first block is modified in the current owner node, and wherein the first block and each modified block is stored in a separate memory location in the memory of the respective home node of that block.

18. The computer system as recited in claim 17 wherein the synchronization operation further comprises transmitting an invalidate request to at least one other node of the plurality of nodes that has a shared copy of a modified block.

19. The computer system as recited in claim 18 wherein the invalidate request comprises a list identifying the modified blocks that are to be invalidated in the at least one other node.

20. The computer system as recited in claim 18 wherein the synchronization operation comprises transmitting invalidate requests to each other node.

21. The computer system as recited in claim 18 wherein the one or more software modules do not check a read share flag corresponding to the modified block prior to transmitting the invalidate requests for the modified block, wherein the read share flag indicates whether or not at least one shared copy of the modified block was provided to another node.

22. The system as recited in claim 2 wherein the invalidate request comprises a list identifying the modified blocks that are to be invalidated in the at least one other node.

23. The computer accessible storage medium as recited in claim 8 wherein the invalidate request comprises a list identifying the modified blocks that are to be invalidated in the at least one other node.

24. The method as recited in claim 14 wherein the invalidate request comprises a list identifying the modified blocks that are to be invalidated in the at least one other node.

\* \* \* \* \*